United States Patent

Haruna et al.

Patent Number: 5,238,979
Date of Patent: Aug. 24, 1993

[54] SYNTHETIC RESINS AND STABILIZER COMPOSITIONS FOR SYNTHETIC RESIN COMPOSITIONS CONTAINING THE SAME

[75] Inventors: Tohru Haruna, Okegawa; Kazunori Nishikawa, Matsudo, both of Japan

[73] Assignee: Asahi Denka Kogyo K.K., Urawa, Japan

[21] Appl. No.: 493,090

[22] Filed: Mar. 12, 1990

[51] Int. Cl.⁵ .................. C08K 5/34; C08K 5/52
[52] U.S. Cl. .................. 524/101; 524/117; 252/400.24; 252/403
[58] Field of Search ............. 524/117, 101; 252/400.24, 403

[56] References Cited

U.S. PATENT DOCUMENTS

| | | | |
|---|---|---|---|
| 4,252,750 | 2/1981 | Buysch et al. | 524/119 |
| 4,351,759 | 9/1982 | Spivack | 524/100 |
| 4,495,320 | 1/1985 | Chasar | 524/117 |

Primary Examiner—Kriellion S. Morgan

[57] ABSTRACT

Stabilizers for enhancing the resistance of synthetic resins to deterioration when exposed to elevated temperatures and/or ultraviolet light comprising from about 0.001 to about 10 parts by weight of a bisphenol phosphite having the formula

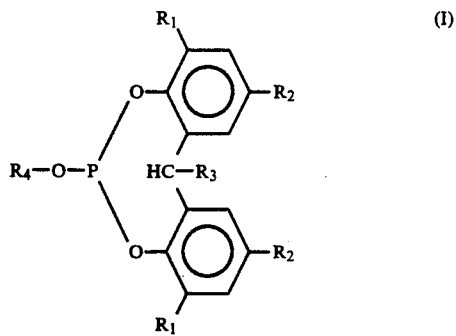

wherein $R_1$ is tertiary-butyl or tertiary-amyl, $R_2$ is alkyl having from one to about nine carbon atoms, $R_3$ is hydrogen or alkyl having from one to about four carbon atoms, and $R_4$ is alkyl having from one to about thirty carbon atoms; and from about 0.001 to about 10 parts by weight of a phenol having the formula

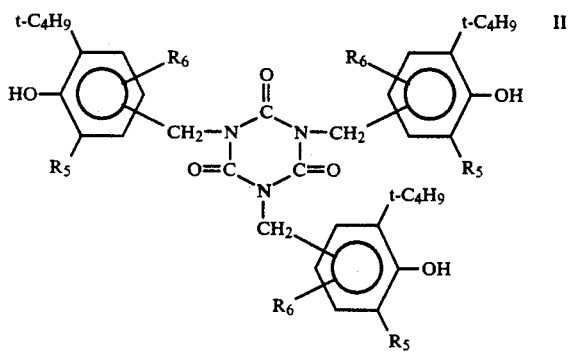

wherein $R_5$ is alkyl having from one to about four carbon atoms; and $R_6$ is hydrogen or alkyl having from one to about four carbon atoms; and stabilized synthetic resin compositions comprising such stabilizers.

28 Claims, No Drawings

SYNTHETIC RESINS AND STABILIZER COMPOSITIONS FOR SYNTHETIC RESIN COMPOSITIONS CONTAINING THE SAME

Synthetic resins such as polyethylene, polypropylene, polystyrene, acrylonitrile-butadiene-styrene terpolymer, and polyvinyl chloride show a strong tendency to deteriorate in physical properties at elevated temperatures and when exposed to ultraviolet light. The deterioration is evidenced by, among other things, a decrease in viscosity, a tendency to become brittle, and discoloration. This deterioration can be accompanied by distortion, cracking, and powdering of the material. To overcome these difficulties, many stabilizers have been proposed for combination with synthetic resins.

No single stabilizer has proved adequate, and combinations of stabilizers are consequently used almost exclusively. Most stabilized synthetic resins on the market contain one or more of such stabilizer combinations. The deterioration appears to be due to a combination of factors, and a combination of stabilizers is therefore more capable of coping with the various types of deterioration. However, the retention of good physical properties over long periods of time remains rather difficult to achieve.

Of the many stabilizer systems that have been proposed for polyolefins, one particularly satisfactory stabilizer system is described in U.S. Pat. No. 3,255,136, patented Jun. 7, 1966 to Arthur Hecker, Otto S. Kauder and Norman Perry. This stabilizer system comprises three stabilizers: an organic mono- or polyhydric phenol, an organic phosphite, and a thiodipropionic acid ester. An additional fourth ingredient, which is preferred but not essential, is a polyvalent metal salt of an organic acid. These three and four stabilizers together give an enhanced stabilization which is not obtainable from any of them alone, or in combinations of two.

In these combinations, the phenol alone gives an improved resistance to embrittlement and reduction in melt viscosity of polypropylene at elevated temperatures, but little assistance as to maintenance of color. The phosphite alone is a rather poor stabilizer in preventing deterioration in the first two properties, but it does assist in resisting discoloration. The two together are worse than the phenol alone in every respect except color, which is intermediate.

The thiodipropionic acid ester by itself only improves resistance to embrittlement. The polyvalent metal salt of an organic acid by itself only prevents discoloration. In combinations with the phenol, the color is worse than with the salt alone, and combinations with phosphite only, discoloration is prevented. The effectiveness of all three or four ingredients taken together against all of these types of deterioration is therefore particularly surprising.

The organic phosphite can be any organic phosphite having the formula $(RA)_3$-P, in which A can be oxygen or sulfur or a mixture of the same, and R is aryl, alkyl, cycloalkyl, aralkyl or aralkaryl in any combination. A variety of tris-alkaryl phosphites are disclosed, such as tris-(tertiary-octyl-phenyl)phosphite and tris-(tertiary-nonyl-phenyl)phosphite, but no tris-(alkaryl)phosphites having more than one alkyl group per phenyl group.

Organic phosphites have been widely used as stabilizers for polyolefins and similar polymeric materials, particularly polyvinyl chloride, and many different types of phosphites, some of rather complex structure, have been proposed. U.S. Pat. Nos. 3,255,136 and 3,655,832 have suggested organic phosphite-phenol transesterification products, the preferred phenol being a bisphenol. Other types of tris-(alkaryl)phosphite esters have been disclosed in U.S. Pat. Nos. 2,220,113; 2,220,845; 2,246,059; 2,419,354; 2,612,488; 2,732,365; 2,733,226; and 2,877,259. Additional tris-(alkaryl)-phosphites are disclosed in U.S. Pat. No. 3,167,526 to Nicholson, patented Jan. 26, 1965; U.S. Pat. No. 3,061,583 to Huhn and Sheets, patented Oct. 30, 1962; U.S. Pat. No. 3,829,396 to Oakes and Cross, patented Aug. 13, 1974; French patents Nos. 1,496,563 to U.S. Rubber Company, délivré Aug. 21, 1967, and 1,497,390 to Ethyl Corporation, délivré Aug. 28, 1967; and British patents Nos. 1,058,977, published Feb. 15, 1967, to Hooker Chemical Corporation and 1,143,375, published Feb. 19, 1969, to Uniroyal Inc.

Oakes et al disclose bis-(2,4-di-tertiary-butyl-phenyl)-cyclohexyl phosphite and 2,4-di-(tertiary butyl)phenyl dicyclohexyl phosphite, which are liquids.

French patent No. 1,496,563 described phosphites derived from 2,6-di-tertiary-butyl-hydroquinone and 2,5-di-tertiary-butyl-hydroquinone, and it is suggested that they can be used with thiodipropionic acid esters of olefin polymers.

British patent No. 1,143,375 has a similar disclosure; tris-(2,5-di-tertiary-butyl-4-hydroxy-phenyl)phosphite is disclosed.

British patent No. 1,058,977 discloses 2,4,6-tri-substituted aryl phosphites, the substituents including tertiary-butyl groups.

French patent No. 1,497,390 discloses tris-(3,5-dialkyl-4-hydroxy-phenyl)phosphites, as well as tris-(3-isopropyl-5-tertiary-butyl-phenyl)phosphite.

Kuriyama et al U.S. Pat. No. 3,558,554 patented Jan. 26, 1971, provides olefin polymer compositions containing as a stabilizer an organophosphite having the general formula:

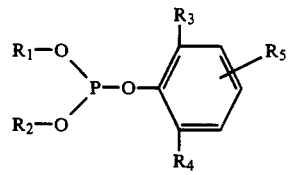

wherein $R_1$ and $R_2$ each represents a member selected from the group consisting of substituted and unsubstituted alkyl, cycloalkyl, aryl, alkaryl, aralkyl, and aliphatic thio ether groups and $R_3$, $R_4$ and $R_5$ each represents a member selected from the group consisting of hydrogen and alkyl, cycloalkyl, aryl, alkaryl, and aralkyl groups, at least one of said $R_3$ and $R_4$ being a tertiary butyl group.

Suitable organo phosphites include, for example, di-n-butyl(2-t-butyl-cresyl)phosphite, di-n-hexyl(2-t-butyl-m-cresyl)phosphite, di-n-hexyl(2-t-butyl-p-cresyl)phosphite, di-n-octyl(2-t-butyl-p-cresyl)phosphite, di-n-butyl-3,4-di-t-butyl-phenyl)phosphite, di-n-butyl-(2,6-di-t-butyl-p-cresyl)phosphite, di-phenyl (2-t-butyl-p-cresyl)phosphite, tri-(2-t-butyl-p-cresyl)-phosphite, di(ethylthioethyl)-(2-t-butyl-p-cresyl)-phosphite, di(octylthioethyl) (2-t-butyl-p-cresyl)-phosphite, and tri (2,4-di-t-butyl-phenyl)phosphite.

Many organic phosphites have been proposed as stabilizers for polyvinyl chloride resins, and are employed either alone or in conjunction with other stabilizing compounds, such as polyvalent metal salts of fatty acids and alkyl phenols. Such phosphite stabilizers normally contain alkyl or aryl radicals in sufficient number to satisfy the three valences of the phosphite, and typical phosphites are described in the patent literature, for example, W. Leistner et al., U.S. Pat. Nos. 2,564,646 of Aug. 14, 1951, 2,716,092 of Aug. 23, 1955, and 2,997,454 of Aug. 2, 1961.

Organic phosphites have also been added as stabilizers in amounts of 0.01 to 1%, preferably 0.05% to 0.2% by weight, to high molecular weight polycarbonate plastics, for example the polycarbonate of 2,2'-bis(4-hydroxyphenyl)propane of molecular weight 10000 and up to over 50000 as disclosed by G. Fritz in U.S. Pat. No. 3,305,520 of Feb. 21, 1967.

A. Hecker in U.S. Pat. No. 2,860,115 of Nov. 11, 1958 discloses compositions of organic phosphites with metal salts of carboxylic acids used in olefin polymers.

Phosphites are also employed in conjunction with other stabilizers such as a polyhydric phenol in the stabilization of polypropylene and other synthetic resins against degradation upon heating or ageing under atmospheric conditions. The polyhydric phenol is thought to function as an antioxidant in such combinations. Disclosures by R. Werkheiser, U.S. Pat. Nos. 2,726,226 of Dec. 6, 1975; I. Salyer et al, 2,985,617 of May 23, 1961; L. Friedman, 3,039,993 of Jun. 19, 1962; W. Nudenberg, 3,080,338 of Mar. 5, 1963; C. Fuchsman, 3,082,187 of Mar. 19, 1963; H. Orloff et al, 3,115,465 of Dec. 24, 1963; A. Nicholson, 3,167,526 of Jan. 26, 1965; A. Hecker et al, 3,149,093 of Sep. 15, 1964, 3,244,650 of Apr. 5, 1966 and 3,225,136 and 3,255,151 of Jun. 7, 1966; C. Bawn, 3,352,820 of Nov. 14, 1967; D. Miller, 3,535,277 of Oct. 20, 1970; J. Casey, 3,586,657 of Jun. 22, 1971; C. Abramoff 3,856,728 of Dec. 24, 1974; M. Minagawa, 3,869,423 of Mar. 4, 1975 and 3,907,517 of Sep. 23, 1975; and British patents Nos. 846,684, 851,670, and 866,883 are representative of stabilizer combinations including organic phosphites, polyhydric phenols, and other active ingredients.

The importance of organic phosphites as stabilizers for synthetic resins has led to the development of a large variety of special phosphites intended to provide improved stabilizing effectiveness and compatability and ease of compounding with the resin and with other stabilizers commonly used. However, the phosphites which have been proposed have not been entirely successful, partly because of their complicated structure, which makes them costly to prepare, and partly because of their difficulty of preparation.

Among these special phosphites, L. Friedman, U.S. Pat. No. 3,047,608 of Jul. 31, 1962 discloses a class of biphosphites having the formula:

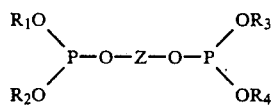

and

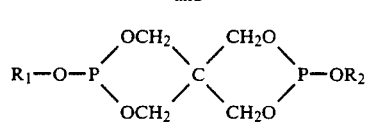

in which $R_1$, $R_2$, $R_3$ and $R_4$ are alkyl or aryl and Z is $-CH_2CH_2SCH_2CH_2O-$, $-C_2CH_2SO_2C_2C-H_2-(-CH_2CH_2O-)_x$ or $(CHCH_3CH_2)_x$ where x is at least two, and in U.S. Pat. No. 3,053,878 of Sep. 11, 1962 a class of linear phosphite polymers having the formula:

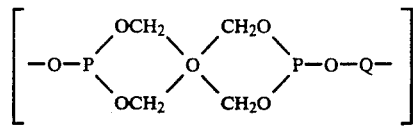

in which Q is the alkylene or arylene portion of a dihydric alcohol or dihydric phenol.

R. Morris et al in U.S. Pat. No. 3,112,286 of Nov. 26, 1963 discloses phosphites having the formula:

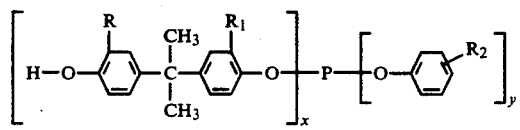

in which

R represents a bulky hydrocarbon group such as t-butyl, t-amyl, t-hexyl, cyclohexyl, t-pentyl, t-octyl, phenyl and the like;

$R_1$ represents hydrogen and R;

$R_3$ represents an alkyl group from six to twenty carbon atoms which is preferably in the meta or para position;

x represents a number of from 1 to 3 inclusive;

y represents a number of from 0 to 2 inclusive and the sum of the numerical value of x+y is always exactly 3.

D. Brown, U.S. Pat. No. 3,297,631 of Jan. 10, 1967 discloses condensation products of phosphorus compounds with bisphenols and trisphenols which may be represented by the structures:

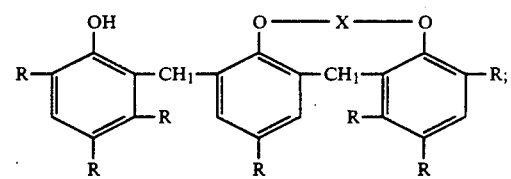

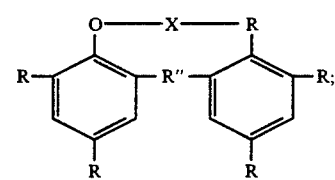

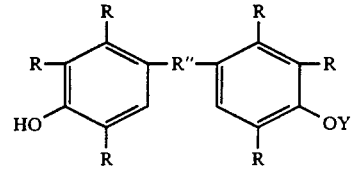

where: X is selected from the following: >P—OR'; >P—R';

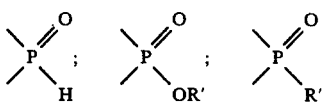

and Y is selected from the following: —P(OR')$_2$;

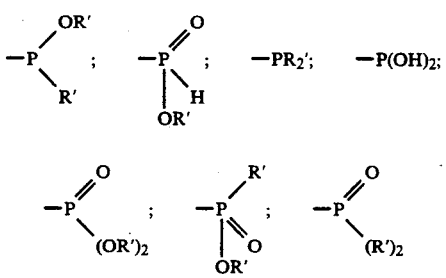

R is hydrogen, alkyl of one to sixteen carbon atoms or aryl or a combination of these; R' is alkyl of one to sixteen carbon atoms or aryl, and R" is alkylidene of one to sixteen carbon atoms or an aryl-substituted alkylidene.

C. Baranauckas, U.S. Pat. No. 3,305,608 of Feb. 21, 1967, discloses phenolic phosphites useful as polymer stabilizers prepared by reacting a triorganophosphite, a polyol, and an aromatic material having two to six phenolic hydroxyl groups at 60° to 180° C. in specified proportions.

C. Brindell, U.S. Pat. No. 3,412,064 of Nov. 19, 1968 discloses phenolic phosphites represented by the general formula:

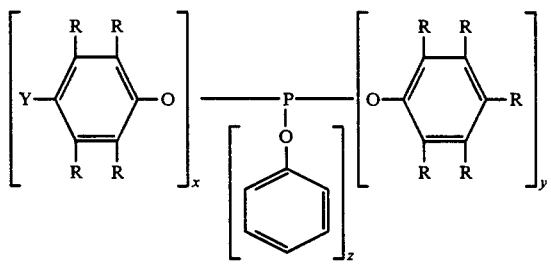

where x is from 1 to 3, y and z each from 0 to 2, x+y+z=3, R is hydrogen or alkyl and Y is hydroxyl or a group of the formula:

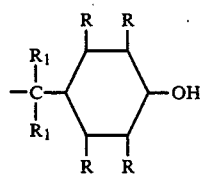

where R is hydrogen or alkyl.

M. Larrison, U.S. Pat. No. 3,419,524 of Dec. 31, 1968, discloses phosphites useful as polymer stabilizers having the formula:

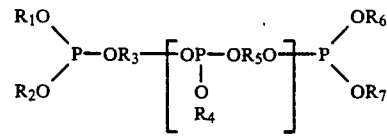

where $R_1$, $R_2$, $R_4$, $R_6$ and $R_7$ are aryl or haloaryl, and $R_3$ and $R_5$ are a polyalkylidene glycol or an alkylidene bisphenol or a hydrogenated alkylidene bisphenol or a ring-halogenated alkylidene bisphenol from which the two terminal hydrogens have been removed.

O. Kauder et al, U.S. Pat. No. 3,476,699 of Nov. 4, 1969 and No. 3,655,832 of Apr. 11, 1972 discloses organic phosphites containing a free phenolic hydroxyl group and defined by the formula:

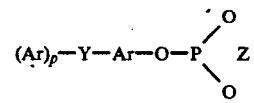

wherein Z is selected from the group consisting of hydrogen and aliphatic, cycloaliphatic, aromatic, heterocyclic and (Ar)$_p$—Y—Ar groups, taken in sufficient number to satisfy the valences of the two phosphite oxygen atoms; Y is a polyvalent linking group selected from the group consisting of oxygen; aliphatic, cycloaliphatic and aromatic hydrocarbon groups attached to each Ar group through a carbon atom not a member of an aromatic ring; oxyaliphatic; thioaliphatic, oxycycloaliphatic, thiocycloaliphatic; heterocyclic, oxyheterocyclic, thioheterocyclic, carbonyl, sulfinyl; and sulfonyl groups; Ar is a phenolic nucleus which can be phenyl or a polycarbocyclic group having condensed or separate phenyl rings; each Ar group is either connected through an oxygen atom to a phosphite group or contains a free phenolic hydroxyl group, or both; and p is a number, one or greater, and preferably from one to four, which defines the number of Ar groups linked to Y.

L. Friedman, U.S. Pat. No. 3,516,963 of Jun. 23, 1970 discloses phosphites having the formula:

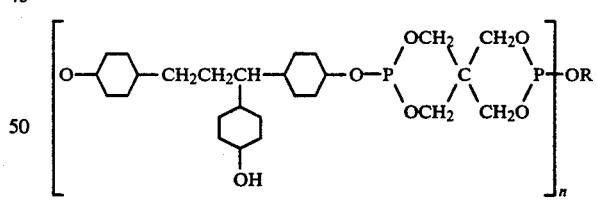

where R is alkyl, alkenyl, aryl, aralkyl, haloaryl, haloalkyl or

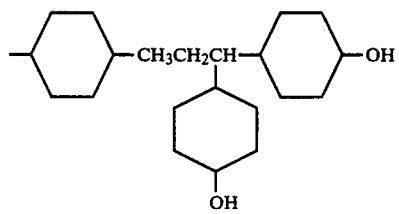

and n is an integer of at least 1, n can be 2, 3, 4, 5, 6, 7, 8, 10, 50, 100 or even more.

D. Bown et al in U.S. Pat. Nos. 3,510,507 of May 5, 1970 and 3,691,132 of Sep. 12, 1972 discloses polyolefins stabilized with polyphosphites, polyphosphates, polyphosphonites, polyphosphonates, polyborates, polycarbonates, and polysilanes which are condensation products of a 4,4'-bisphenol with a condensing or linking agent which may be of the ester type, such as the esters of triaryl or mixed aryl-alkyl compounds, or the acid halide type. Bown's condensation product stabilizers have molecular weights between 600 and 8000 or higher and are described by the structural formula:

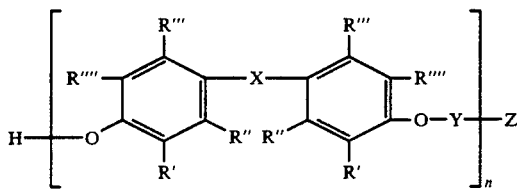

where X is selected from the group consisting of —S—,

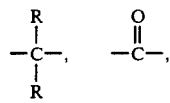

—C—C, and C—A—C— where A is a $C_1$ to $C_{16}$ alkylene or an arylene; R', R'', R''', and R'''' are selected from the group consisting of hydrogen, $C_1$ to $C_{18}$ alkyls, and an aryl group; Y is selected from the group of

where R is hydrogen, a $C_1$ to $C_{18}$ alkyl or aryl;

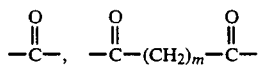

where m is 0 to 10, preferably 4 to 8,

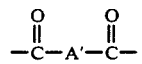

where A' is $(CH_2)_n$—S—$(CH_2)_n$ or —$(CH_2)_n$—S—$(CH_2)_m$—S—$(CH_2)_n$ where n is 0 to 10, preferably 2 and m is 0 to 10, preferably 5;

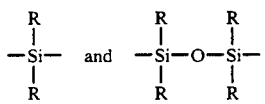

where R is an alkyl, preferably methyl, and Z is

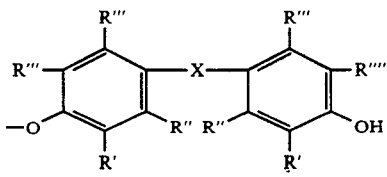

where R', R'', R''', R'''', and X correspond respectively to the R', R'', R''', R'''', and X previously selected when n has a value from 1 to 15, or may be derived from the compound used to introduce Y into the product when n has a value from 2 to 15, for example, —R or —OR where R is hydrogen, an alkyl, or aryl. When Y in the formula of Bown's stabilizer is

the stabilizer is a type of hydroxyaryl phosphite. Similarly, when Y in the formula is

the stabilizer is a hydroxyaryl carbonate.

Bown's condensation products are described as especially effective in high molecular weight solid polyolefins when used together with a dialkyl sulfide costabilizer such as dilauryl thiodipropionate, distearyl thiodipropionate, ditridecyl thiodipropionate, dicetyl sulfide, bis(tetradecylmercapto)paraxylylene, and 10, 24-dithiotetracontane.

J. Floyd et al in German published application No. 2505071 of Aug. 14, 1975 abstracted in *Chemical Abstracts* 1976, Volume 84, abstract No. 5945f, discloses low molecular weight polycarbonate esters of bisphenols such as 2,2-bis(3-t-butyl-4-hydroxyphenylpropane) and 4,4'-butylidene bis(6-t-butyl-3-methylphenol) prepared in such a way as to contain few or no free phenolic hydroxyl groups as being highly effective heat and light stabilizers for polyolefins and giving a synergistic effect with distearyl thiodipropionate, tris (nonylphenyl)phosphite, and distearyl pentaerythritol diphosphite.

U.S. Pat. No. 4,252,750 to Buysch et al, patented Feb. 24, 1981, provides phosphorous acid esters corresponding to the general formula

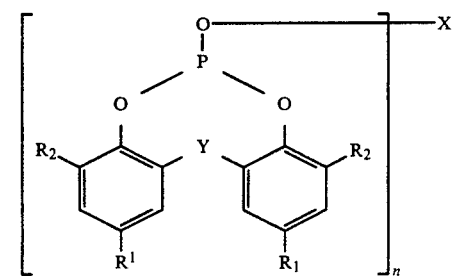

wherein
  $R_2$ is a benzyl, α-methylbenzyl, α,α-dimethylbenzyl, cyclopentyl or cyclohexyl radical;

$R_1$ is a $C_1$-$C_9$ alkyl, a $C_5$-$C_6$ cycloalkyl, a $C_7$-$C_9$ aralkyl or a $C_6$-$C_{10}$ aryl radical;

Y is a sulphur atom or a group HC—$R_3$, in which $R_3$ is a hydrogen atom a $C_1$-$C_6$ alkyl, a cyclohexyl or cyclohexenyl radical;

X is a hydrogen atom, an optionally substituted single-bond to four-bond straight-chain or branched-chain $C_1$-$C_{18}$ aliphatic radical, A $C_7$-$C_{18}$ aralkyl radical or a $C_6$-$C_{18}$ aromatic radical, each of which radicals may optionally contain olefinic double bonds and/or hetero atoms, preferably N, O and/or S atoms, and n is an integer from 1 to 4, preferably from 1 to 2, provided that when X is a hydrogen atom the n is 1.

U.S. Pat. No. 4,288,391, to Spivack, patented Sep. 8, 1981, provides alkylated 1,1'-biphenyl-2, 2'-diyl phosphites represented by the formula

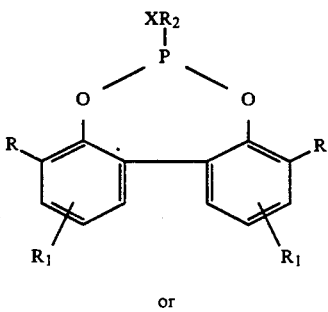

or

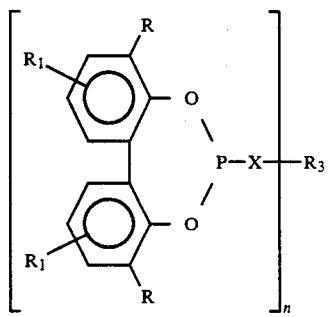

wherein

R is an alkyl group of 1 to 18 carbon atoms, $R_1$ is hydrogen or an alkyl group of 1 to 18 carbon atoms, and $R_2$ is an alkyl group of 1 to 20 carbon atoms, phenyl, phenyl substituted by 1 to 3 alkyl groups each having 1 to 8 carbon atoms or by two alkyl groups each having 1 to 8 carbon atoms and by —COOR$_4$ where R$_4$ is alkyl of 1 to 18 carbon atoms, $R_3$ is an n-valent radical selected from the group consisting of a straight- or branched-chain alkylene of 2 to 12 carbon atoms, a straight- or branched-chain alkane-triyl, -tetrayl, -pentayl or -hexayl of 3 to 6 carbon atoms, alkenylene of 4 to 6 carbon atoms, cycloalkylene of 6 to 12 carbon atoms, 1,4-cyclohexanedimethylene, arylene or arenetriyl of 6 to 10 carbon atoms, p-xylylene, phenylene —E—phenylene where E is a direct bond, —O—, —S—, —NR$_5$—, where R$_5$ is alkyl of 1 to 18 carbon atoms; a straight- or branched-chain alkylene or alkylidene of 1 to 12 carbon atoms or cycloalkylidene of 5 to 6 carbon atoms, said arylene or said phenylene-E-phenylene substituted by 1 to 4 alkyl groups each having 1 to 8 carbon atoms, —(CH$_2$)$_x$S(CH$_2$)$_x$— where x is 2 to 6, dipentaerythrityl, and

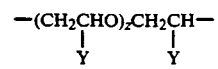

where

Y is hydrogen, methyl or ethyl and z is 1 to 10,

X is oxygen or sulfur, and n is 2 to 6.

U.S. Pat. No. 4,318,845 to Spivack et al, patented Mar. 9, 1982, provides alkanolamine esters of 1,1'-biphenyl-2,2'-diyl-and alkylidene-1,1'-biphenyl-2,2'-diyl-cyclic phosphites corresponding to the formula:

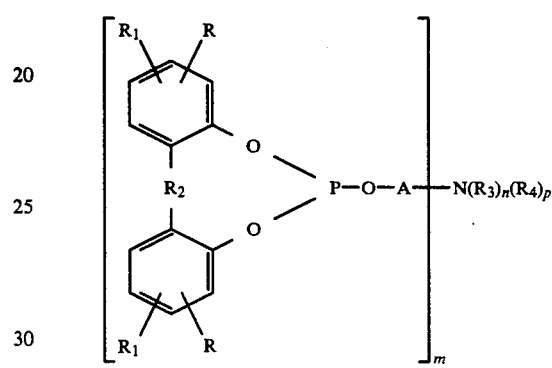

such that when m=1, n=1 and p=1, m=2, n=1 and p=0, m=3, n and p are zero, and wherein R is an alkyl group of 1 to 18 carbon atoms, $R_1$ is hydrogen or an alkyl group of 1 to 18 carbon atoms;

$R_2$ is a direct bond or lower alkylene of 1 to 12 carbon atoms;

A is alkylene of 1 to 6 carbon atoms or cycloalkylene of 5 to 6 carbon atoms;

$R_3$ is an alkyl of 1 to 18 carbon atoms, or

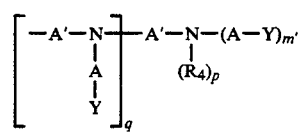

wherein Y is

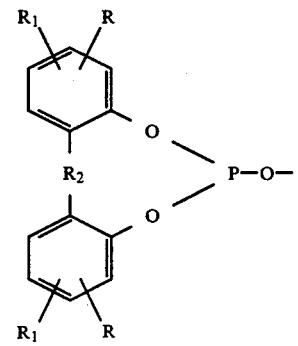

A' is alkylene of 1 to 6 carbon atoms or cycloalkylene of 5 to 6 carbon atoms, m' is 1 or 2, p is 0 or 1, and q is 0–5 with A, R, $R_1$, $R_2$ being as previously defined; provided that when p and q are 0, —N—A'—N can be a diazacycloalkyl group of 2 to 10 carbon atoms or, when m is 1 and p is 0, N—$R_3$ is an azacycloalkyl group of 2 to 10 carbon atoms or an azaoxacycloalkyl group of 3 to 7 carbon atoms; and $R_4$ is alkyl of 1 to 18 carbon atoms.

U.S. Pat. No. 4,362,830 to Minagawa et al, patented Dec. 7, 1982, provides hindered bis-phenol phenyl phosphites having the structure:

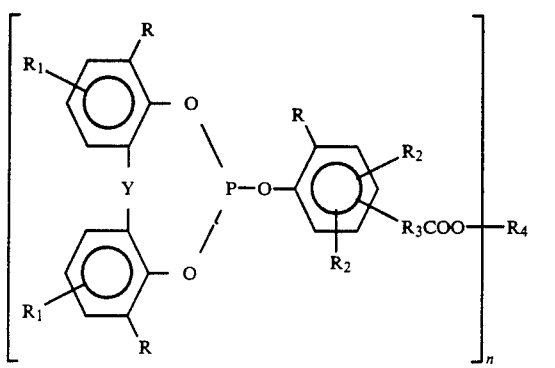

wherein:

R is selected from the group consisting of alkyl having from one up to about eighteen carbon atoms; cycloalkyl having from three up to about twelve carbon atoms; alkaryl and aryl having from six to about eighteen carbon atoms; preferably, a bulky group such as iso, secondary or tertiary alkyl having from three to about ten carbon atoms; or cycloalkyl having six to twelve carbon atoms;

$R_1$ and $R_2$ are each selected from the group consisting of hydrogen; alkyl having from one to about eighteen carbon atoms; cycloalkyl having from three up to about twelve carbon atoms; alkaryl and aryl having from six to about eighteen carbon atoms; and are preferably in a position ortho to a phenolic hydroxyl or phenoxy group, if available;

$R_3$ is alkylene having from one to about six carbon atoms;

$R_4$ is selected from the group consisting of alkylene, cycloalkylene, and aralkylene, the residue of a monohydric or polyhydric alcohol, having from one to about eighteen carbon atoms, and from none to three hydroxyl groups (originally one to four hydroxyl groups);

Y is selected from the group consisting of a direct carbon to carbon bond; thio sulfur —S—; oxy oxygen —O—; alkylidene having from one to about six carbon atoms; and cycloalkylidene having from four to about eight carbon atoms; and n is 1, 2, 3, or 4, according to the valence of $R_4$.

U.S. Pat. No. 4,371,646 to Minagawa et al, patented Feb. 1, 1983, provides 2,6-di-tertiary butyl phenyl phosphites having the structure

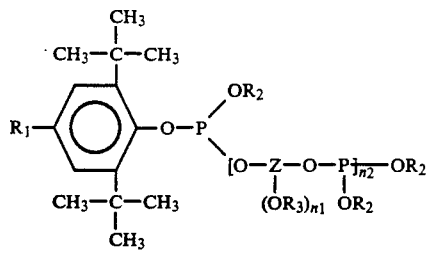

wherein:

$R_1$ is selected from the group consisting of hydrogen, methyl, ethyl, and $(CH_2)_m COOR$, where R is selected from the group consisting of alkyl having from one up to about ten carbon atoms; cycloalkyl having from three up to about twelve carbon atoms; alkaryl and aryl having from six to about twelve carbon atoms; and m is a number within the range from 0 to 5;

$R_2$ is selected from the group consisting of hydrogen, alkyl having from one to about twenty-two carbon atoms; cycloalkyl having from three up to about twelve carbon atoms; alkaryl and aryl having from six to about eighteen carbon atoms; the residue of a polyhydric alcohol having from two to about eighteen carbon atoms, and from two to three hydroxyl groups; and the residue of a polyphenol having from six to about eighteen carbon atoms and from two to about ten phenolic hydroxyl groups;

$R_3$ is selected from the group consisting of hydrogen and $P(OR_2)_2$;

Z is the bivalent to tetravalent residue of a polyhydric alcohol having from two to about eighteen carbon atoms, and from two to five hydroxyl groups; or of a polyphenol having from six to about eighteen carbon atoms and from two to about ten phenolic hydroxyl groups;

$n_1$ is 0 or 1; and $n_2$ is a number from 1 to 5.

U.S. Pat. No. 4,371,647 to Minagawa et al, patented Feb. 1, 1983, provides 2,6-di-tertiary butyl phenyl pentaerythritol spiro bis-phosphites having the structure:

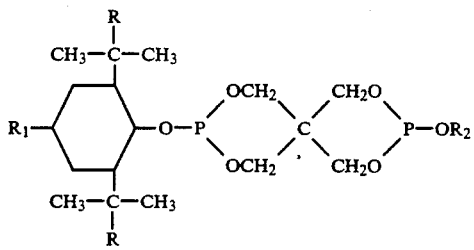

wherein:

R is alkyl having from one to six carbon atoms;

$R_1$ is methyl or ethyl;

$R_2$ is selected from the group consisting of alkyl having from one up to about eighteen carbon atoms; cycloalkyl having from three up to about twelve carbon atoms; and alkaryl and aryl having from six to about thirty carbon atoms; such groups substituted with from one to about four oxy ether —O— and/or carboxylic ester —COO— groups; the residue of a polyhydric alcohol having from two to about eighteen carbon atoms, and from two to about ten hydroxyl groups; and the residue of a polyphenol having from two to about eighteen carbon atoms and from two to about ten phenolic hydroxyl groups.

U.S. Pat. No. 4,670,492, patented Jun. 2, 1987, to Nakahara, Haruna and Tobita, provides cyclic bis and tris phosphites having the formula:

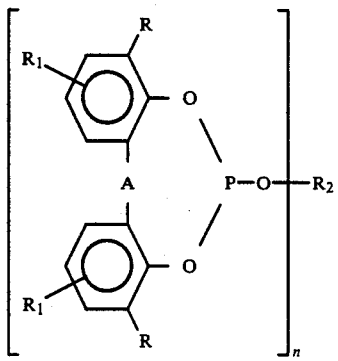

wherein:

A is selected from the group consisting of sulfur; oxygen; alkylidene having from one to about six carbon atoms; cycloalkylidene having from three to about eight carbon atoms; and phenyl and alkyl phenyl alkylidene having from seven to about fourteen carbon atoms;

R is selected from the group consisting of alkyl having from one to about eighteen carbon atoms; cycloalkyl having from three to about eight carbon atoms; and phenalkylidene and alkyl phenalkylidene having from seven to about twelve carbon atoms;

$R_1$ is selected from the group consisting of hydrogen; alkyl having from one to about eighteen carbon atoms; cycloalkyl having from three to about eight carbon atoms; and phenalkylidene and alkyl phenalkylidene having from seven to about twelve carbon atoms;

n is 2 or 3;

$R_2$ is

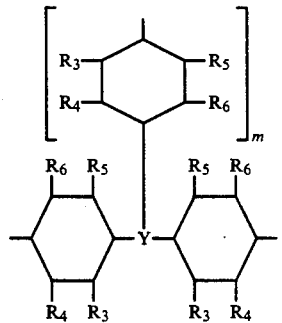

wherein:

m=0 when n is 2; and 1 when n is 3;

$R_3$, $R_4$, $R_5$, $R_6$ are hydrogen or lower alkyl; and, when the rings are aromatic, at least two of $R_3$, $R_4$, $R_5$ and $R_6$ in each ring is lower alkyl; and Y is alkylidene having from three to about six carbon atoms; or

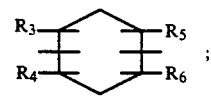

or

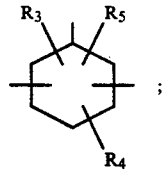

the rings in $R_2$ being saturated or aromatic, and, when the rings are aromatic, at least two of $R_3$, $R_4$, $R_5$ and $R_6$ in each ring is lower alkyl, as well as stabilized synthetic resin compositions containing such phosphites.

Exemplary A alkylidene includes methylidene, ethylidene, isopropylidene, propylidene, isobutylidene, butylidene, cyclohexylidene, cycloheptylidene, cyclopentylidene, cyclobutylidene, benzylidene, methyl benzylidene, isopropyl benzylidene, dimethyl benzylidene, diisopropyl benzylidene;

Exemplary R, $R_1$, $R_3$, $R_4$, $R_5$ and $R_6$ lower alkyl include methyl, ethyl, isopropyl, t-butyl, sec-butyl, t-amyl, and hexyl; exemplary R and $R_1$ higher alkyl include heptyl, octyl, isooctyl, t-octyl, nonyl, t-nonyl, decyl, dodecyl, and octadecyl; exemplary R and $R_1$ cycloalkyl include cyclohexyl, α-methylcyclohexyl, cyclobutyl, cyclopentyl, cycloheptyl, cyclooctyl; exemplary R and $R_1$ phenalkylidene include benzyl, α-methylbenzyl and α,α-dimethylbenzyl, phenethylidene, phenbutylidene, phenhexylidene, xylyl, mesityl, 1,1,3-tris (2-methyl-4-hydroxy-5-t-butylphenyl) butane and 1,3,5-tris(3,5-di-t-butyl-4-hydroxy benzyl)-2,4,6-trimethylbenzene.

These phosphites have one hindered bisphenol group of the structure:

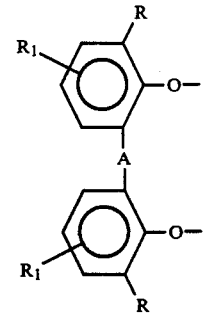

derived from the corresponding phenol. Exemplary phenols include 2,2'-methylenebis(4-methyl-6-t-butylphenol), 2,2'-methylenebis(4-ethyl-6-t-butylphenol), 2,2'-methylenebis (4,6-di-t-butylphenol), 2,2'-methylenebis [4-methyl-6-(α-methylcyclohexyl) phenol], 2,2'-n-butylidenebis(4,6-dimethylphenol), bis-1,1-(21-hydroxy-3',5'-dimethylphenyl)-3,5,5-tri-methylhexane, 2,2'-cyclohexylidenebis(4-ethyl-6-t-butylphenol), 2,2'-isopropylbenzylidene-bis(4-ethyl-6-t-butylphenol), 2,2'-thiobis(4-t-butyl-6-methylphenol), 2,2'-thiobis(4-methyl-6-t-butylphenol), 2,2'-thiobis (4,6-di-t-butylphenol), 2,2'-methylenebis(4-α-methylbenzyl-6-cyclohexylphenol), 2,2'-methylenebis(4-cyclohexyl-6-α-methylbenzylphenol), 2,2'-ethylidenebis(4-methyl-6-t-butylphenol), 2,2'-ethylidenebis(4-sec-butyl-6-butylphenol), bis(2-hydroxy-3-t-butylphenyl) ether and bis(2-hydroxy-3-propylphenyl) ether.

Phenolic antioxidants are generally used as basic antioxidants for synthetic resins. As disclosed in U.S. Pat. No. 4,670,492, such phenolic antioxidants contain one or more phenolic hydroxyl groups, and one or more phenolic nuclei, and can contain from about eight to about three hundred carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggragate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

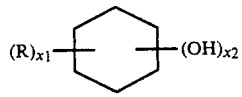

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl

where R' is aryl, alkyl or cycloalkyl.

$x_1$ and $x_2$ are integers from one to four, and the sum of $x_1$ and $x_2$ does not exceed six.

Polycyclic phenols have at least two aromatic nuclei linked by a polyvalent linking radical, as defined by the formula:

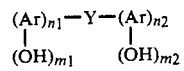

wherein

Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups. The linking group can have from one up to twenty carbon atoms.

Ar is a phenolic nucleus which can be a phenyl or a polycarbocyclic group having condensed or separate phenyl rings; each Ar group contains at least one free phenolic hydroxyl group up to a total of five. The Ar rings can also include additional rings connected by additional linking nuclei of the type Y, for example, Ar-Y-Ar-Y-Ar.

$m_1$ and $m_2$ are numbers from one to five, and $n_1$ and $n_2$ are numbers of one or greater, and preferably from one to four.

The aromatic nucleus Ar can, in addition to phenolic hydroxyl groups, include one or more inert substituents.

It has also been suggested that specific combinations of selected highly substituted triarylphosphites and selected phenolic antioxidants are particularly effective.

Zinke, Lorenz and Linhart U.S. Pat. Nos. 4,187,212, patented Feb. 5, 1980, and 4,290,941, patented Sep. 22, 1981 propose stabilization systems consisting of a triarylphosphite of the general formula

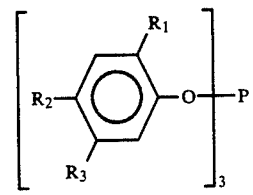

wherein $R_1$ represents tert-butyl, 1,1-dimethylpropyl, cyclohexyl or phenyl, and one of $R_2$ and $R_3$ is hydrogen and the other is hydrogen, methyl, tert-butyl, 1,1-dimethylpropyl, cyclohexyl or phenyl; and a phenolic antioxidant, for stabilizing polyolefins.

The following are mentioned as examples of phenolic compounds;

1. Single 2,6-dialkylphenols.
2. Bisphenols, such as 2,2'-methylene-bis-(6-tert-butyl-4-methylphenol), 2,2'-methylene-bis-(6-tert-butyl-4-ethylphenol), 2,2'-methylene-bis[4-methyl-6-(α-methyl-cyclohexyl)-phenol], 1,1-bis(5-tert-butyl-4-hydroxy-2-methylphenyl)-butane, 2,2-bis-(5-tert-butyl-4-hydroxy-2-methylphenyl)-butane, 2,2-bis-(3,5-di-tert-butyl-4-hydroxyphenyl)-propane, 1,1,3-tris(5-tert-butyl-4-hydroxy-2-methylphenyl)-butane, 2,2-bis-(5-tert-butyl-4-hydroxy-2-methyl-phenyl)-4-n-dodecylmetcapto-butane, 1,1,5,5-tetra-(5-tert-butyl-4-hydroxy-2-methylphenyl)-pentane, ethylene glycol-bis-[3,3-bis-(3'-tert-butyl-4-'-hydroxyphenyl)-butyrate], 1,1-bis-(3,5-dimethyl-2-hydroxyphenyl)-3-(n-dodecylthio)-butane, or 4,4'-thio-bis-(6-tert-butyl-3-methylphenol).
3. Hydroxybenzyl aromates.
4. Amides of β-(3,5-di-tert-butyl-4-hydroxyphenyl)-propionic acid.
5. Esters of β-(3,5-di-tert-butyl-4-hydroxyphenyl)-propionic acid with mono- or polyvalent alcohols.
6. Spiro compounds, such as diphenolic spiro-diacetals or spiro-diketals.

Particularly preferred phenolic compounds are: 1,3,5-tri-(3,5-di-tert-butyl-4-hydroxybenzyl)-2,4,6-trimethylbenzene, pentaerythritol-tetra[3-(3,5-di-tert-butyl-4-hydroxyphenyl)-propionate], β-(3,5-di-tert-butyl-4-hydroxyphenyl)propionic acid-n-octadecyl ester, thio-diethylene glycol-β-[4-hydroxy-3,5-di-tert-butyl-phenyl]-propionate, 2,6-di-tert-butyl-4-methyl-phenol, and 3,9-bis-[1,1-dimethyl-2-(3,5-ditert-butyl-4-hydroxy-phenyl)-ethyl]-2,4,8,10-tetraoxaspiro-[5,5]-undecane.

Miller et al U.S. Pat. No. 4,360,617, patented Nov. 23, 1982, proposes combinations of symmetrical triarylphosphites of the general formula I

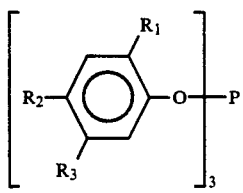

wherein
- R₁ is tert-butyl, 1,1-dimethylpropyl, cyclohexyl or phenyl, and one of
- R₂ and R₃ is hydrogen and the other is hydrogen, methyl, tert-butyl, 1,1-dimethylpropyl, cyclohexyl or phenyl, with phenolic antioxidants for stabilizing organic polymers which contain hetero atoms, double bonds or aromatic rings. The phenolic antioxidants are of the same types as used by Zinke et al.

In accordance with this invention, stabilizers are provided comprising a 2,2'-alkylidenebisphenyl-alkyl cyclic phosphite having formula (I):

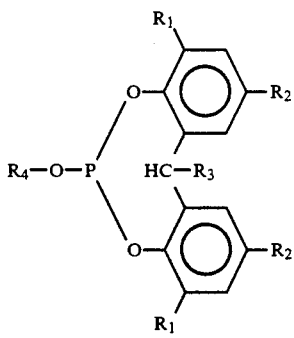

wherein:
- R₁ is tertiary-butyl or tertiary-amyl;
- R₂ is alkyl having from one to about nine carbon atoms;
- R₃ is hydrogen or alkyl having from one to about four carbon atoms; and
- R₄ is alkyl having from one to about thirty carbon atoms; and a 1,3,5-tris(hydroxybenzyl)isocyanurate compound having the formula (II):

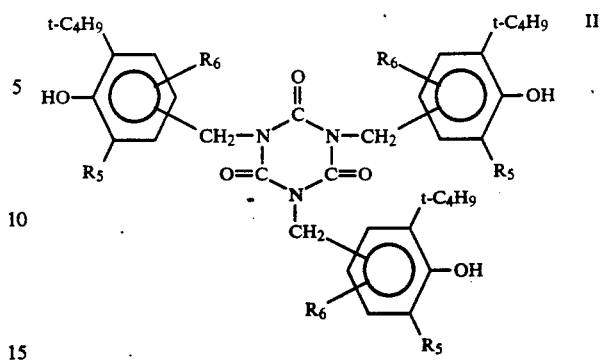

wherein R₅ is alkyl having from one to about four carbon atoms; and R₆ is hydrogen or alkyl having from one to about four carbon atoms; and stabilized synthetic resin compositions comprising such stabilizers.

Also provided are synthetic resin compositions comprising such stabilizers and thereby having improved resistance to deterioration when exposed to heat and/or ultraviolet light.

Exemplary R₂, R₃, R₄ and R₅ alkyl having from one to about nine (R₂), to about four (R₃ or R₅), or to about thirty (R₄) carbon atoms include methyl, ethyl, propyl, isopropyl, butyl, sec-butyl, t-butyl, isobutyl, amyl, t-amyl, hexyl, heptyl, octyl, isooctyl, 2-ethylhexyl, t-octyl, nonyl, t-nonyl, decyl, isodecyl, dodecyl, tetradecyl, hexadecyl, octadecyl, eicosyl, docosyl, tetracosyl and triacontyl.

Typical phosphites of formula (I) which can be used in the stabilizers and synthetic resin compositions of the invention include the following:

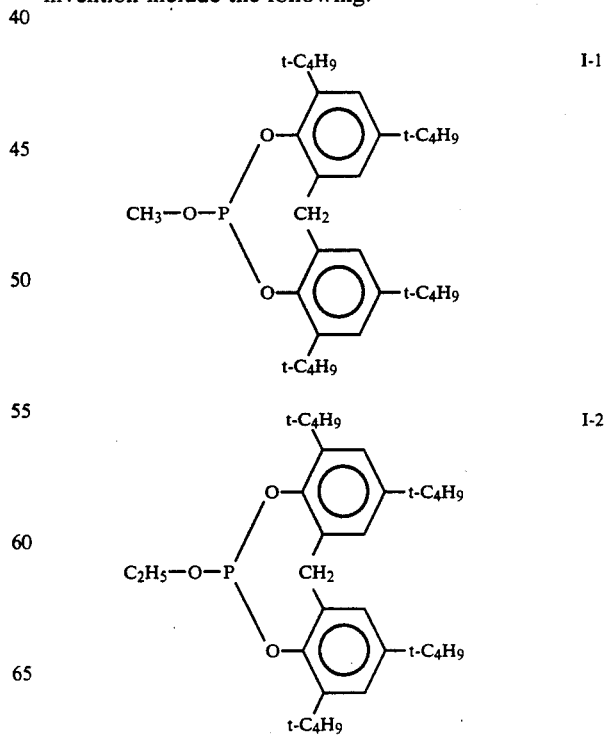

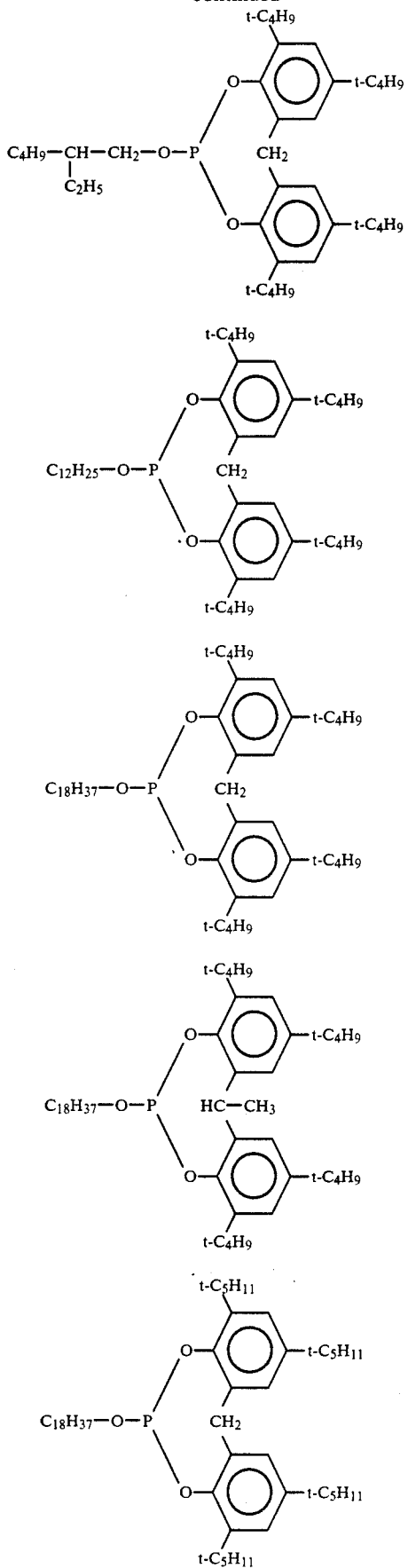
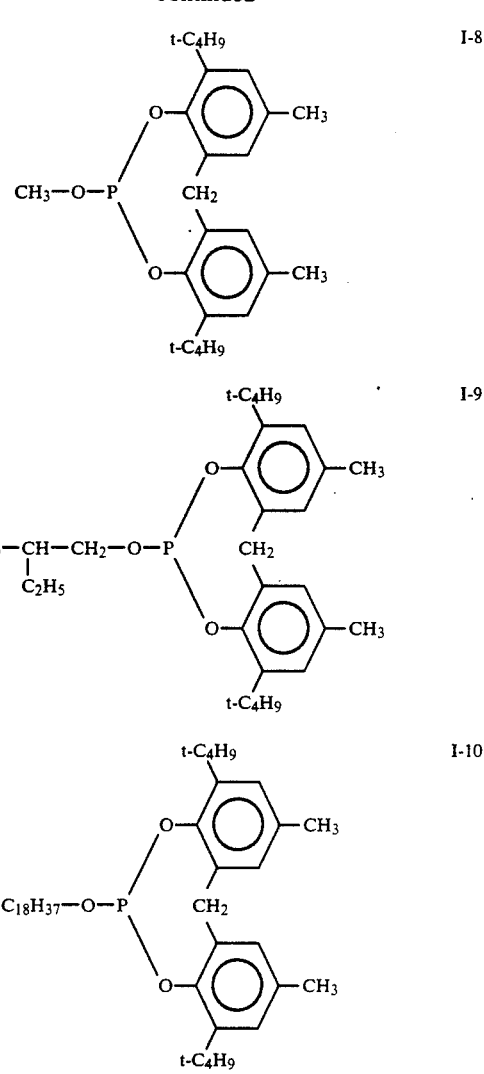

These phosphites can be prepared easily by reacting the corresponding 2,2'-alkylidenebisphenol with phosphorous trichloride, followed by reacting with the corresponding alcohol R₄OH. The following Example illustrates this procedure.

EXAMPLE A

Synthesis of 2,2'-methylenebis(4,6-di-t-butylphenyl) stearyl phosphite (Phosphite compound I-5)

A mixture of 2,2'-methylenebis(4,6-di-t-butylphenol) 42.5 g, toluene 100 g, and 0.86 g of triethylamine was heated to 60°–65° C., and then 16.5 g of phosphorous trichloride was added dropwise. The mixture was then stirred for two hours under reflux in a stream of nitrogen.

Excess phosphorous trichloride was distilled off under reduced pressure. After cooling to 60° C., 12.1 g of triethylamine and 27 g of stearyl alcohol were added, and the mixture was stirred for 4 hours at 80° C. After cooling, the triethylamine hydrochloride produced was filtered off, and then the solvent was distilled off.

The residue was recrystallized from methanol, and a white powder melting at 65° C. was obtained. IR $(cm^{-1})$ 2925 and 2850: methylene, 1230 and 1200: t-butyl, 1100: —O-phenyl, 1020: —O-alkyl, 840: P—O-phenyl
H¹-NMR (60 MHz, with TMS as standard, in CDCl₃), δ value 0.8: 3H, t, —CH₃, 1.2–1.3: 73H, sss. t-butyl and stearyl, 3.2–4.4: 4H, dd, methylene and —O—CH₂—, 7.2: 4H, s, aromatic hydrogen
Typical Examples of phenolic antioxidants of formula (II) are as follows:
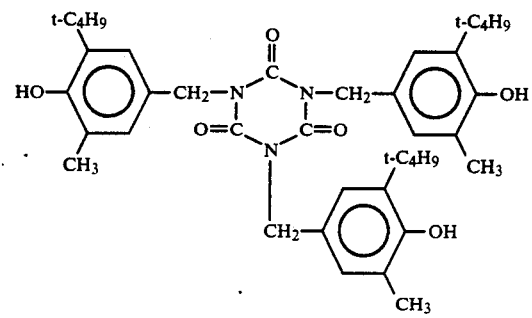
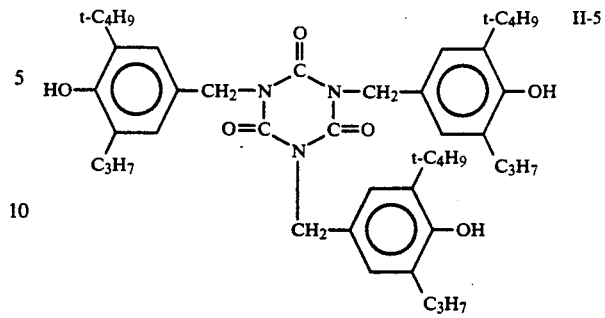
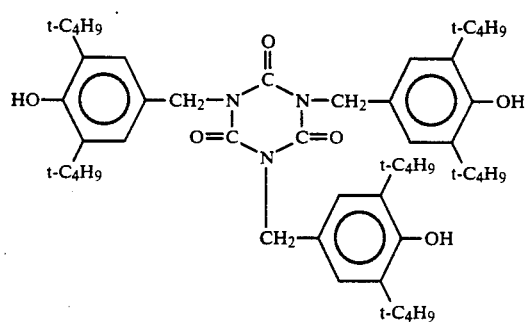
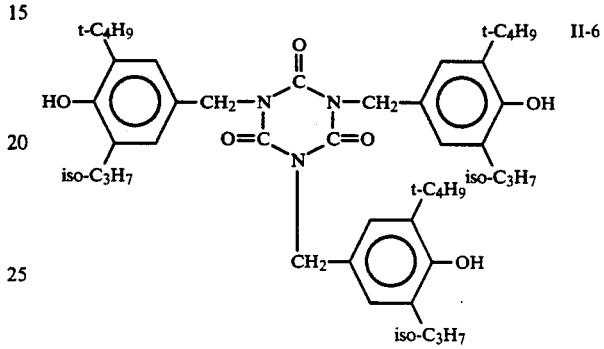
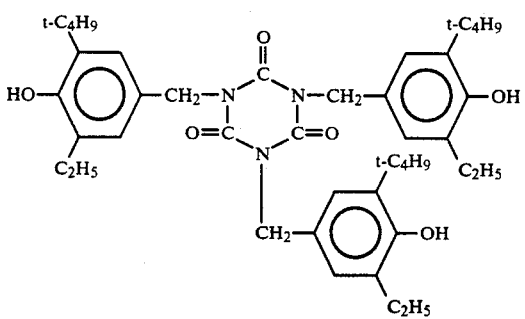
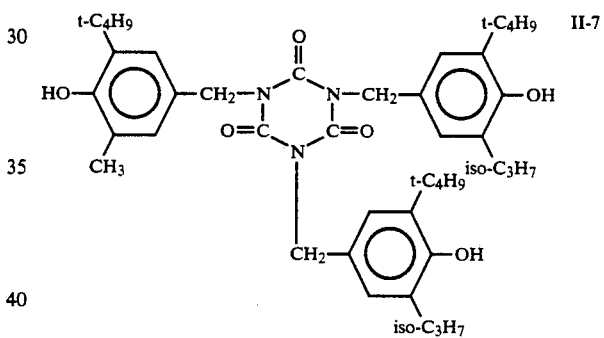
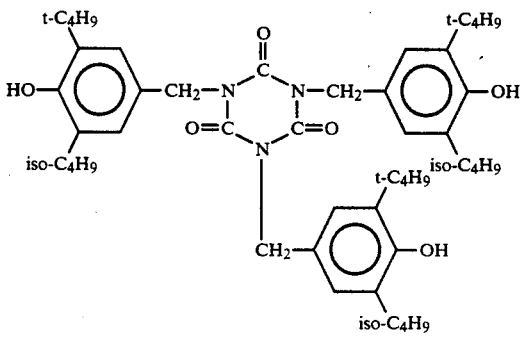
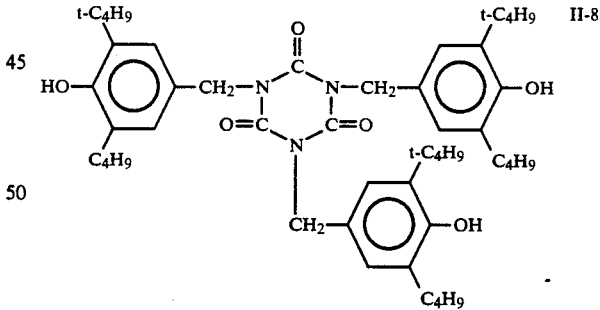
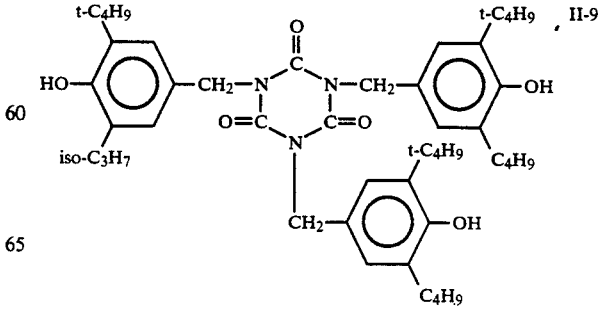

-continued
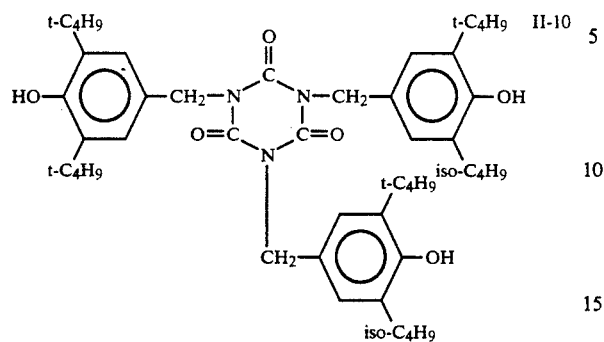 II-10
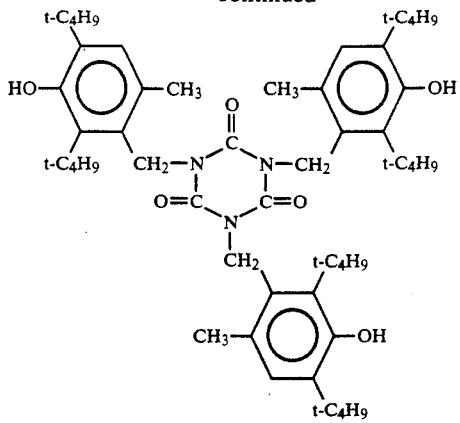 II-14
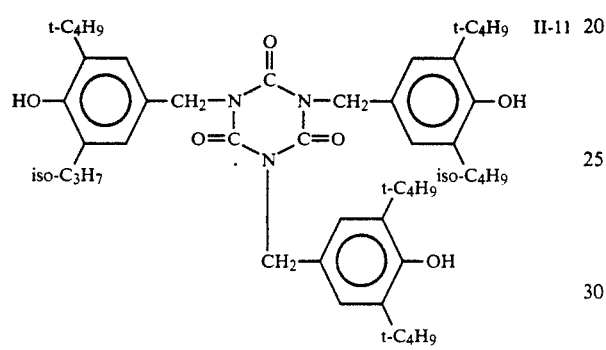 II-11
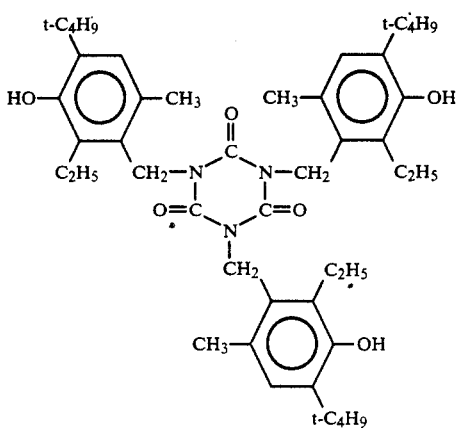 II-15
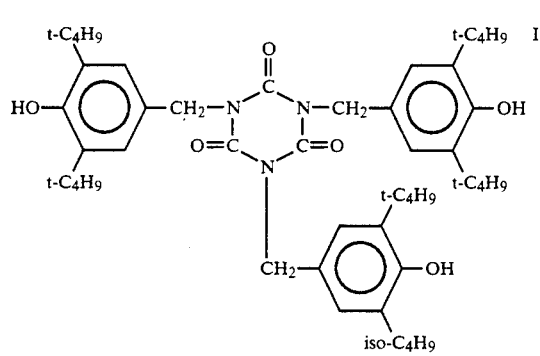 II-12
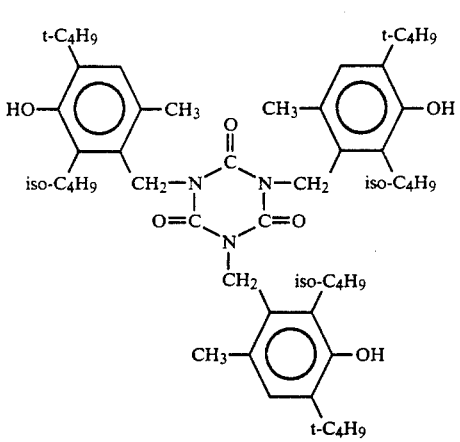 II-16
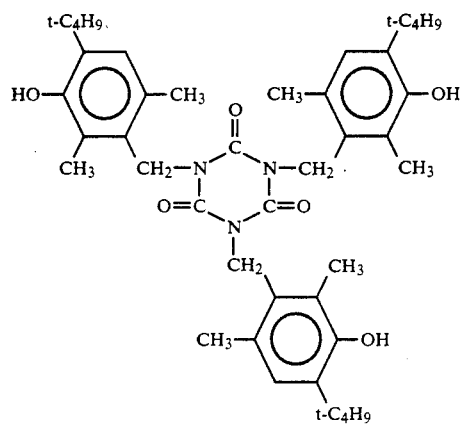 II-13
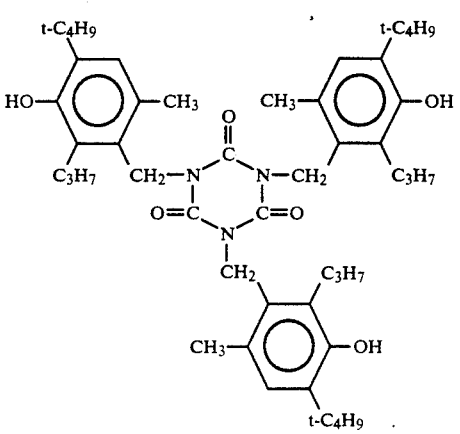 II-17

-continued

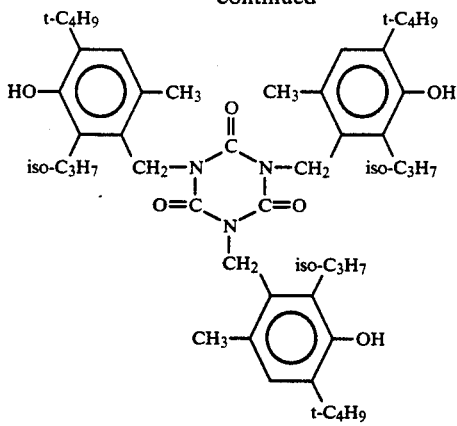

II-18

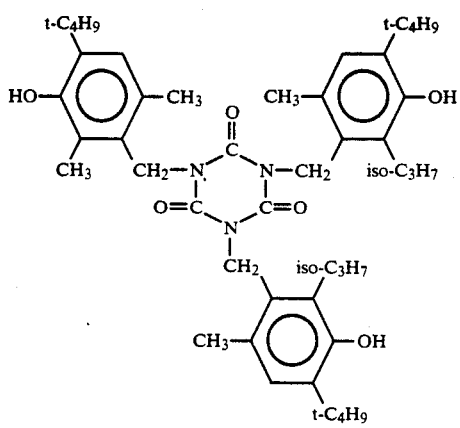

II-19

Synthetic resins which can be stabilized with the stabilizer combinations of this invention include olefin polymers and copolymers, such as polyethylene, polypropylene, polybutene, poly-3-methylpentene, ethylene/vinyl acetate copolymer and ethylene/propylene copolymer; halogen-containing resins such as polyvinyl chloride, polyvinyl bromide, polyvinyl fluoride, polyvinylidene chloride, chlorinated polyethylene, chlorinated polypropylene, chlorinated rubber, vinyl chloride/vinyl acetate copolymer, vinyl chloride/ethylene copolymer, vinyl chloride/propylene copolymer, vinyl chloride/styrene copolymer, vinyl chloride/styrene/maleic anhydride terpolymer, vinyl chloride/butadiene copolymer, vinyl chloride/acrylic acid ester copolymer, vinyl chloride/methacrylic acid copolymer, vinyl chloride/acrylonitrile copolymer; polyvinyl acetate; acrylic resin; polystyrene; copolymer of styrene with other copolymerizable monomers such as maleic anhydride, butadiene and acrylonitrile; acrylonitrile/butadiene/styrene terpolymer; acrylic acid ester/butadiene/styrene terpolymer; methacrylic acid ester/butadiene/styrene terpolymer; polymethyl methacrylate; polyvinyl alcohol; polyvinyl butyral; linear polyesters such as polyethylene terephthalate and polybutylene terephthalate; polyphenylene oxide; polyamide; polycarbonate; polyacetal; polyurethane; and epoxy resins.

The stabilizer combinations of this invention can be used in combination with other conventional heat and light stabilizers such as, for example, phenolic antioxidants, such as those disclosed in U.S. Pat. No. 4,670,492, thioether antioxidants, and ultraviolet light stabilizers.

Exemplary preferred conventional phenolic antioxidants other than those of Formula (II) which can be employed together with the stabilizers of the invention include 2,6-di-t-butyl-p-cresol, 2,6-diphenyl-4-octadecyloxyphenol, distearyl-(3,5-di-t-butyl-4-hydroxybenzyl)phosphonate, 4,4'-thiobis(6-t-butyl-m-cresol), 2,2'-methylenebis(4-methyl-6-t-butylphenol), 2,2'-methylene-bis(4-ethyl-6-t-butylphenol), ethyleneglycol-bis-(3,3-bis(4-hydroxy-3-t-butyl)butyrate), 4,4'-butylidenebis(6-t-butyl-m-cresol), 2,2'-ethylidenebis(4,6-di-t-butylphenol), 2,2'-ethylidenebis(4-sec-butyl-6-t-butylphenol), 2-t-butyl-4-methyl-6-(2'-acryloyloxy-3'-t-butyl-5'-methylbenzyl)-phenol, bis(2-t-butyl-4-methyl-6-(2'-hydroxy-3'-t-butyl-5'-methylbenzyl)phenyl)terephthalate, 1,1,3-tris(2'-methyl-4'-hydroxy-5'-t-butylphenyl)butane, 1,3,5-tris(3',5'-di-t-butyl-4'-hydroxybenzyl)isocyanurate, 1,3,5-tris(2',6'-dimethyl-3'-hydroxy-4'-t-butylbenzyl)isocyanurate.

The polyvalent metal salts of an organic acid are of organic acids having from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogenous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reactions, such as by mixing the acid, or anhydride with the corresponding oxide or hydroxide of the metal in a liquid solvent, and heating, if necessary, until salt formation is complete.

Thiodipropionic acid esters have the following formula:

$$R_1OOCCH_2CH_2-S-CH_2CH_2COOY$$

in which $R_1$ is an organic radical selected from the group consisting of hydrocarbon radicals such as alkyl, alkenyl, aryl, cycloalkyl and mixed alkyl aryl and mixed alkyl cycloalkyl radicals; hydroxyalkyl and hydroxyalkyloxyalkylene radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of n thiodipropionic acid ester units:

—XO[OCCH$_2$CH$_2$SCH$_2$CH$_2$COOXO]$_n$
OCCH$_2$CH$_2$—S—CH$_2$COOZ where Z is hydrogen, $R_2$ or M, n is the number of thiodipropionic acid ester units in the chain, and X is a bivalent hydrocarbon group of the type of $R_1$, that is, alkylene, alkenylene, cycloalkylene, mixed alkylene-arylene and mixed alkylene-cycloalkylene radicals; hydroxyalkylene and hydroxyalkyloxyalkylene radicals; and esters thereof with aliphatic carboxylic acids; the value of n can range upwards from 0, but there is no upper limit on n except as is governed by the ratio of carbon atoms to sulfur atoms as stated below; and (d) a polyvalent metal M of Group II of the periodic table such as zinc, calcium, cadmium, barium, magnesium and strontium.

The molecular weights of the R and Y radicals are taken such that with the remainder of the molecular the thiodipropionic ester has a total of from about ten to about sixty carbon atoms per sulfur atom.

Accordingly, the various thiodipropionic acid ester species coming within the above-designated categories within the general formula can be defined as follows:
  (a) $R_1$OOCCH$_2$CH$_2$SCH$_2$CH$_2$COOH
  (b) $R_1$OOCCH$_2$CH$_2$SCH$_2$CH$_2$COOR$_2$
  (c) $R_1$O[OCCH$_2$CH$_2$SCH$_2$CH$_2$COOX—O]-$_n$OCCH$_2$CH$_2$SCH$_2$CH$_2$COOZ
  (d) $R_1$OOCCH$_2$CH$_2$SCH$_2$CH$_2$COOM In the above formulae $R_1$ and $R_2$, M, X and Z are the same as before and the value of $n_1$ can range upwards from 1, but there is no upper limit on $n_1$ except as is imposed by the ratio of carbon atoms, as stated below. In the polymer (c), as in the other forms of thiodipropionic acid esters, the total number of carbon atoms per sulfur atom is within the range from about ten to about sixty.

The R radical of these esters is important in furnishing compatibility with the polymer. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described above.

The aryl, alkyl, alkenyl, and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl-substituted alkylene radicals such as 1,2-propylene,

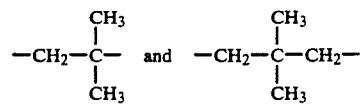

arylene radicals such as phenylene

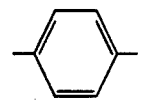

methylenephenylene

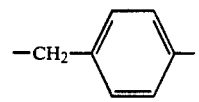

dimethylene phenylene

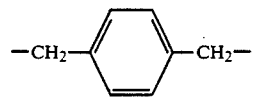

and alicyclylene such as cyclohexylene

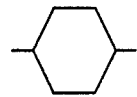

and cyclopentylene

As exemplary of the thiodipropionic acid esters which can be used, there can be mentioned the following: monolauryl thiodipropionic acid, dilauryl thiodipropionate, butyl stearyl thiodipropionate, 2-ethylhexyl lauryl thiodipropionate, di-2-ethylhexyl-thiodipropionate, diisodecyl thiodipropionate, isodecyl phenyl thiodiprionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soyabean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl) thiodipropionic acid.

These esters are for the most part known compounds, but where they are not available, they are readily prepared by esterification of thiodipropionic acid and the corresponding alcohol.

Also useful are:

(1) Thioalkanoic acid amides of Tokuno et al Japanese patent No. 16,286/68 having the formula:

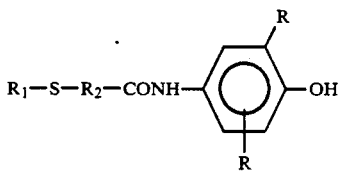

R is alkyl of one to eight carbon atoms, $R_1$ is alkyl of six to twenty-four carbon atoms, and $R_2$ is alkylene of one to six carbon atoms.

(2) Thioalkanoic acid amides of 1,3,5-triazines of Ozeki et al Japanese patent No. 20,366/68 having the formula:

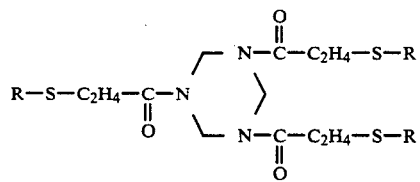

R is alkyl of eight to eighteen carbon atoms.

(3) Bis-thioalkanoic acid amides of Yamamoto et al Japanese patent No. 23,765/68 having the formula:

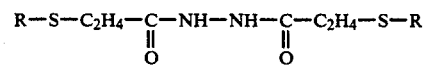

R is alkyl of more than six carbon atoms, aryl or aralkyl.

(4) Bis-thioalkylanoic acid amides of Ozeki et al Japanese patent No. 26,184/69 having the formula:

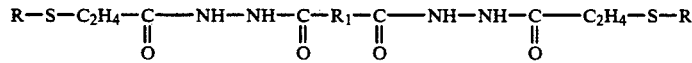

R is alkyl of twelve to eighteen carbon atoms, and $R_1$ is alkylene of one to ten carbon atoms, cycloalkylene, or arylene.

(5) Bis-alkylene thioalkanoic acid amides of Ozeki Japanese patent No. 31,464/69 having the formula:

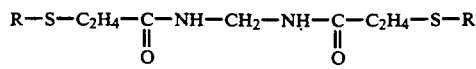

R is alkyl of more than six carbon atoms, aryl, or aralkyl.

(6) Thioalkanoic acid amide derivatives of Minagawa et al, published Japanese application No. 106,484/74 having the formula:

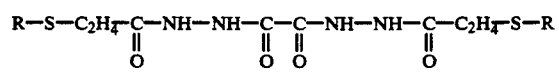

R is hydrocarbyl of one to twenty carbon atoms.

(7) Alkylene bis-thioalkanoic acid amides of U.S. Pat. No. 4,279,805 to Ohzeki et al, patented Jul. 21, 1981, having the general formula:

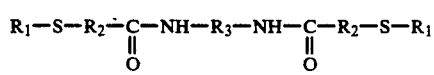

wherein:
$R_1$ is alkyl having from one to about fifty carbon atoms;
$R_2$ is alkylene having from one to about three carbon atoms; and
$R_3$ is alkylene having from about two to about twelve carbon atoms.

β-Alkylthiopropionic acid esters having the general formula:

wherein:
R is alkyl of four to twenty carbon atoms;
n is a number from 1 to 6; and
R' is the residue of an alcohol having from one to six hydroxyl groups.

Pentaerythritol tetra dodecyl thio propionate is an example of this group.

Exemplary preferred thioether antioxidants include dialkylthiodipropionates such as dilauryl-, dimyristyl- and di-stearylthiodipropionate; and esters of β-alkylthiopropionic acid with polyhydric alcohols such as pentaerythritol tetrakis (β-dodecylthiopropionate).

Conventional ultraviolet light stabilizers can be employed with the stabilizers of the invention, including hydroxybenzophenones such as 2-hydroxy-4-methoxybenzophenone, 2-hydroxy-4-n-octoxybenzophenone, 5,5'-methylenebis(2-hydroxy-4-methoxy-benzophenone) and 2,4-dihydroxybenzophenone; benzotriazoles such as 2-(2-hydroxy-3-t-butyl-5-methylphenyl-5-chlorobenzotriazole, 2-(2-hydroxy-3,5-di-t-butyl-phenyl)-5-chlorobenzotriazole, 2-(2-hydroxy-5-methylphenyl) benzotriazole, 2-(2-hydroxy-5-t-octylphenyl) benzotriazole, 2-(2-hydroxy-3,5-di-t-butylphenyl) benzotriazole, 2-(2-hydroxy-3,5-di-cumylphenyl) benzotriazole, and 2,2'-methylenebis(4-t-octyl-6-benzotriazolylphenol); benzoates such as phenylsalicylate, resorcinolmonobenzoate, 2,4-di-t-butylphenyl-3,5-di-t-butyl-4-hydroxybenzoate and hexadecyl-3,5-di-t-butyl-4-hydroxybenzoate; substituted oxanilides such as 2-ethyl-2'-ethoxy-4'-dodecyloxanilide and 2-ethoxy-4'-dodecyloxanilide; cyanoacrylates such as ethyl-$\alpha$-cyano-$\beta,\beta$-diphenylacrylate and methyl-2-cyano-3-methyl-3-(p-methoxyphenyl) acrylate; and hindered amine light stabilizers such as 2,2,6,6-tetramethyl-4-piperidylstearate, 1,2,2,6,6-pentamethyl-4-piperidylstearate, 2,2,6,6-tetramethyl-4-piperidylbenzoate, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidyl)butane-1,2,3,4-tetracarboxylate, tetrakis(1,2,2,6,6-tetramethyl4-piperidyl)-butane-1,2,3,4-tetracarboxylate, bis(1,2,2,6,6-pentamethyl-4-piperidyl)di(tridecyl)-butane-1,2,3,4-tetracarboxylate, bis(1,2,2,6,6-pentamethyl-4-piperidyl)-2-butyl-2-(3,5-di-t-butyl-hydroxybenzyl) malonate, condensate of 1-(2-hydroxyethyl)-2,2,6,6-tetramethyl-4-piperidinol with diethylsuccinate, condensate of 1,6-bis(2,2,6,6-tetramethyl-4-piperidylamino) hexane with dibromoethane, condensate of 2-t-octylamino-4,6-dichlorotriazine with 1,6-bis(2,2,6,6-tetramethyl-4-piperidylamino) hexane and condensate of 2-morpholino-4,6-dichlorotriazine with 1,6-bis(2,2,6,6-tetramethyl-4-piperidylamino) hexane.

In addition, other conventional additives for synthetic resins, such as heavy metal deactivators, nucleating agents, metal soaps, plasticizers, flame retardants, lubricants, processing aids, blowing agents, pigments, fillers and antistatic agents can be employed.

A sufficient amount of the stabilizer combination is used to improve the resistance of the synthetic polymer to deterioration in physical properties when exposed to heat and/or light, including, for example, discoloration, reduction in melt viscosity, and embrittlement. Very small amounts are usually adequate. Amounts within the range from about 0.001 to about 20% total stabilizers including the cyclic phosphite I and phenolic antioxidant II heat stabilizers of the invention by weight of the polymer are satisfactory. Preferably, from 0.01 to 10% is employed for optimum stabilization.

The preferred amount of the phosphite compound of Formula (I) is from 0.001 to 10, more preferably from 0.01 to 3 parts by weight based on 100 parts by weight of the synthetic resin.

The preferred amount of the phenolic antioxidant of Formula (II) is from 0.001 to 10, more preferably from 0.01 to 3 parts by weight based on 100 parts by weight of the synthetic resin.

When all components are solids, stabilizer systems including the stabilizer combinations of the invention and any other desired ingredients are readily rendered in solid particulate form, comprising a blend of:

(a) phosphite of Formula I in an amount from about 10 to about 35 parts by weight;

(b) phenolic antioxidant of Formula II in an amount from about 10 to about 35 parts by weight;

(c) other heat or light stabilizers in an amount of from about 10 to about 35 parts by weight.

Thus, for example, in the case of polyvinyl chloride resins, other polyvinyl chloride resin heat stabilizers can be included, including polyvalent metal fatty acid salts such as barium and cadmium salts of the higher fatty acids; organotin compounds; and epoxy compounds.

With polyolefin resins there can be employed fatty acid salts of polyvalent metals, and the higher fatty acid esters of thiodipropionic acids, such as, for example, dilauryl thiodipropionate.

With polyamide resin compositions, polyamide stabilizers such as copper salts in combination with iodides and/or other phosphorus compounds and salts of divalent manganese can be used.

With synthetic rubbers and acrylonitrile-butadiene-styrene terpolymers, other antioxidants and polyvalent metal salts of the higher fatty acids can be used.

Any method of adding the stabilizers of this invention to the synthetic resin can be used, for example, dry blending the stabilizers with powder or pellets of synthetic resin; spraying a solution or melt of stabilizers on powder or pellets of synthetic resin; and blending a dispersion of stabilizers with synthetic resin latex, and then salting-out.

The stabilizer or combination is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the stabilizer. Mixing is continued until the mixture is substantially uniform. The resulting composition is then removed from the mixing equipment and brought to the size and shape desired for marketing or use.

The stabilized polymer can be worked into the desired shape, such as by milling, calendering, extruding or injection molding or fiber-forming. In such operations, it will be found to have a considerably improved resistance to reduction in melt viscosity during the heating, as well as a better resistance to discoloration and embrittlement on ageing and heating.

The following Examples illustrate preferred embodiments of stabilizer and synthetic resin compositions of the invention.

EXAMPLES 1 TO 10

Polypropylene compositions were prepared using ten stabilizers of the invention and two of the prior art, and having the following formulation:

| Ingredient | Parts by Weight |
|---|---|
| Polypropylene (Profax 6501) | 100 |
| Calcium stearate | 0.05 |
| Phenolic antioxidant | 0.1 |
| 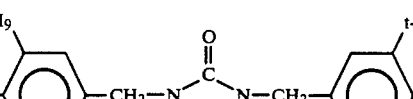 | |
| Phosphite as shown in Table I | 0.1 |

The compositions were thoroughly blended in a mixer, and then extruded at 280° C. to prepare pellets. Test pieces 1 mm thick were prepared by injection molding at 250° C.

The test pieces were heated at 160° C. in a Geer oven, and the hours to failure as well as the yellowness index of the pieces before and after exposure to fluorescent light for 72 hours were noted.

The compositions were extruded at 280° C. five times, and the melt index (g/10 min) after the first extrusion (MI-1) and after the fifth extrusion (MI-5) were noted.

The results are shown in Table I:

TABLE I

| Phosphite | Hours to Failure | Yellowness Index | Melt Index MI-1 | MI-5 | MI-1/MI-5 |
|---|---|---|---|---|---|
| Controls | | | | | |
| 1. Bis(2,4-di-t-butylphenyl) (3-t-butyl-2-hydroxy-5-methylbenzyl) phosphite derivative [tris(di-t-butylphenyl) type structure with CH₂ bridge] | 243 | 10.7 | 2.1 | 3.9 | 1.86 |
| 2. Neopentyl bis-phosphite structure: (CH₃)₂C(CH₂—O—P[...])₂ with 4-methyl-6-t-butylphenoxy and CH₂-bridged aryl groups | 255 | 9.3 | 1.9 | 3.5 | 1.84 |
| Examples | | | | | |
| 1. CH₃—O—P with cyclic structure having two di-t-butylphenoxy groups bridged by CH₂ | 334 | 7.2 | 1.7 | 2.3 | 1.35 |
| 2. C₂H₅—O—P with cyclic structure having two di-t-butylphenoxy groups bridged by CH₂ | 322 | 7.3 | 1.8 | 2.4 | 1.33 |

TABLE I-continued

| | Phosphite | Hours to Failure | Yellowness Index | Melt Index MI-1 | MI-5 | MI-1/MI-5 |
|---|---|---|---|---|---|---|
| 3 | C₄H₉—CH—CH₂—O—P(—O—[2,4-di-t-C₄H₉-phenyl])(—O—[2,4-di-t-C₄H₉-phenyl]) bridged by CH₂, with C₂H₅ branch | 322 | 7.3 | 1.7 | 2.3 | 1.35 |
| 4 | C₁₂H₂₅—O—P(—O—[2,4-di-t-C₄H₉-phenyl])(—O—[2,4-di-t-C₄H₉-phenyl]) bridged by CH₂ | 310 | 7.4 | 1.8 | 2.5 | 1.39 |
| 5 | C₁₈H₃₇—O—P(—O—[2,4-di-t-C₄H₉-phenyl])(—O—[2,4-di-t-C₄H₉-phenyl]) bridged by CH₂ | 322 | 7.3 | 1.8 | 2.3 | 1.28 |
| 6 | C₁₈H₃₇—O—P(—O—[2,4-di-t-C₄H₉-phenyl])(—O—[2,4-di-t-C₄H₉-phenyl]) bridged by HC—CH₃ | 334 | 7.2 | 1.7 | 2.2 | 1.29 |

TABLE I-continued

| | Phosphite | Hours to Failure | Yellowness Index | Melt Index MI-1 | MI-5 | MI-1/MI-5 |
|---|---|---|---|---|---|---|
| 7 | 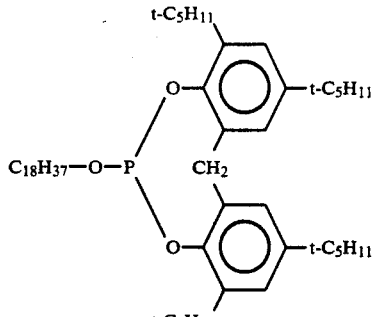 | 334 | 7.2 | 1.8 | 2.3 | 1.28 |
| 8 | 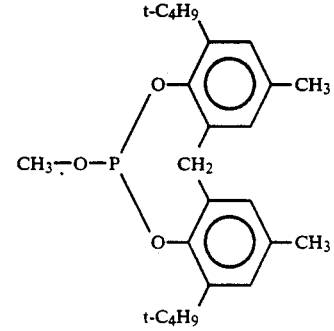 | 322 | 7.2 | 1.7 | 2.2 | 1.29 |
| 9 | 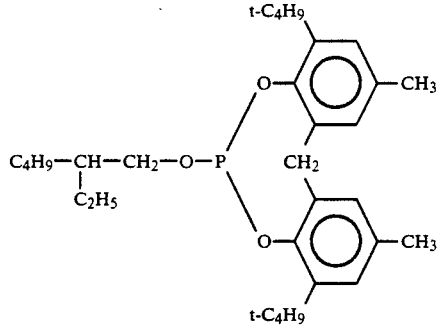 | 322 | 7.3 | 1.8 | 2.3 | 1.28 |
| 10 | 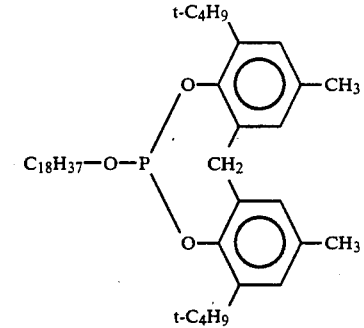 | 320 | 7.3 | 1.7 | 2.3 | 1.35 |

The superiority of the phosphites of the invention when combined with this phenol is apparent from comparison with the bisphosphites of the controls.

EXAMPLES 11 TO 13

Polypropylene compositions were prepared as in Examples 1 to 10, and having the following formulation:

| Ingredient | Parts by Weight |
|---|---|
| Polypropylene (Profax 6501) | 100 |
| Calcium stearate | 0.05 |
| Phosphite compound | 0.1 |

| Ingredient | Parts by Weight |
|---|---|
| 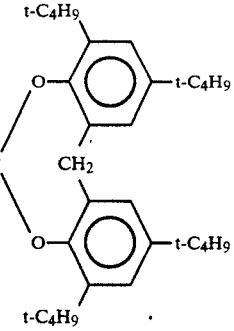 | |
| Phenolic antioxidant as shown in Table II | 0.1 |

The compositions were thoroughly blended in a mixer, and then extruded at 280° C. to prepare pellets. Test pieces 1 mm thick were prepared by injection molding at 250° C.

The test pieces were heated at 160° C. in a Geer oven, and the hours to failure as well as the yellowness index of the pieces before and after exposure to fluorescent light for 72 hours were noted.

The compositions were extruded at 280° C. five times, and the melt index (g/10 min.) after the first extrusion (MI-1) and after the fifth extrusion (MI-5) were noted.

The results are shown in Table II:

TABLE II

| | Phenolic antioxidant | Change of Melt Index (MI-1/MI-5) |
|---|---|---|
| Controls | | |
| 1 | None | 3.16 |
| 2 | 2,4-Bis(octylthio)-6-N-(4-hydroxy-3,5-di-t-butylphenyl)amino-1,3,5-triazine | 2.41 |
| 3 | 4,4'-n-Butylidenebis(2-t-butyl-5-methylphenol) | 2.03 |
| Examples | | |
| 11 | 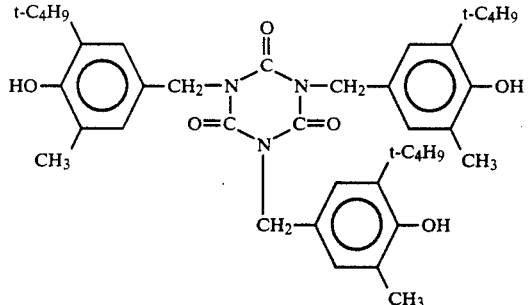 | 1.34 |
| 12 | 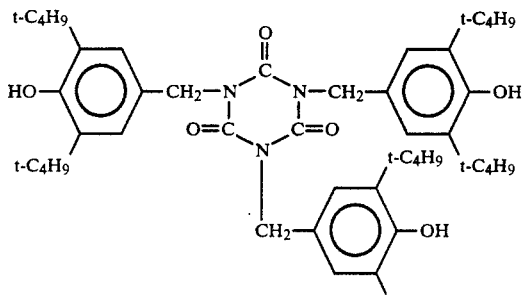 | 1.29 |

TABLE II-continued

| Phenolic antioxidant | Change of Melt Index (MI-1/MI-5) |
|---|---|
| 13 (tris(3,5-di-tert-butyl-substituted benzyl) isocyanurate structure shown) | 1.32 |

The superiority of the phenols of the invention when combined with this phosphite is apparent from comparison with the bisphenols of the controls.

EXAMPLES 14 TO 26

Polypropylene compositions were prepared containing an inorganic filler, and having the following formulation:

| Ingredient | Parts by Weight |
|---|---|
| Polypropylene (Profax 6501) | 80 |
| Talc | 20 |
| Calcium stearate | 0.05 |
| Phenolic antioxidant | 0.1 |

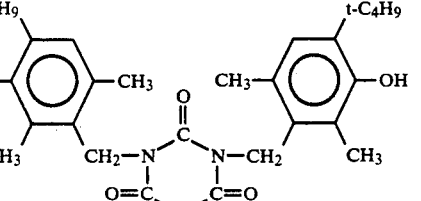

| Ingredient | Parts by Weight |
|---|---|
| Dilaurylthiodipropionate | 0.2 |
| Phosphite as shown in Table III | 0.1 |

The compositions were thoroughly blended in a mixer, and then extruded at 250° C. to prepare pellets. Test pieces 1 mm thick were prepared by injection molding at 250° C.

The test pieces were heated at 160° C. in a Geer oven, and the hours to failure were noted. The results are shown in Table III.

TABLE III

| | Phosphite | Hours to Failure |
|---|---|---|
| Controls | | |
| 1 | None | 253 |

TABLE III-continued
| | Phosphite | Hours to Failure |
|---|---|---|
| 2 | | 341 |
| 3 | | 353 |
Examples
| | | |
|---|---|---|
| 14 | 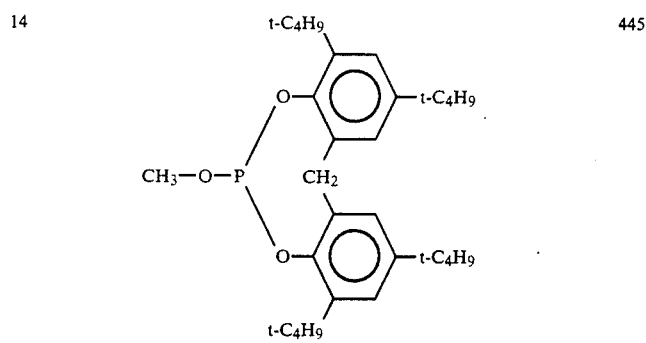 | 445 |
| 15 | 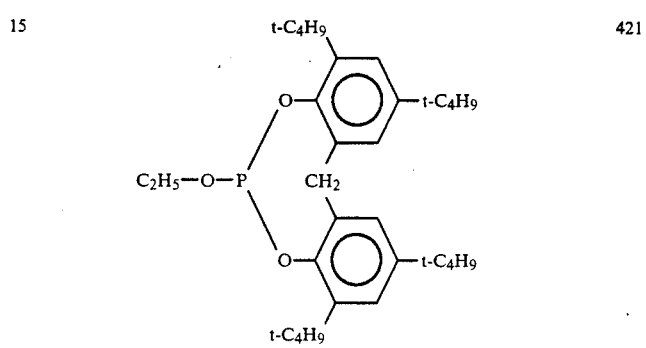 | 421 |

TABLE III-continued

| | Phosphite | Hours to Failure |
|---|---|---|
| 16 | 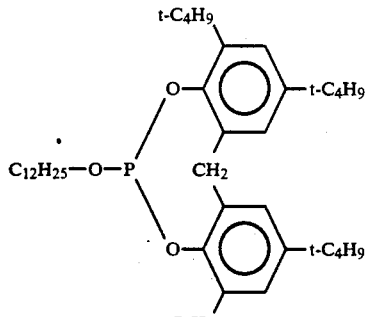 | 445 |
| 17 | 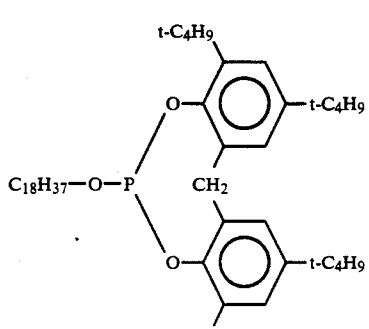 | 443 |
| 18 | 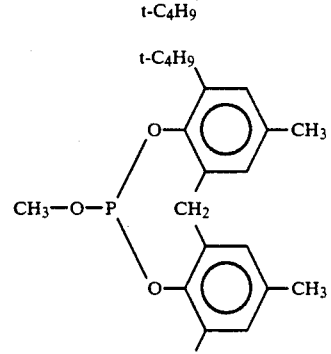 | 409 |
| 19 | 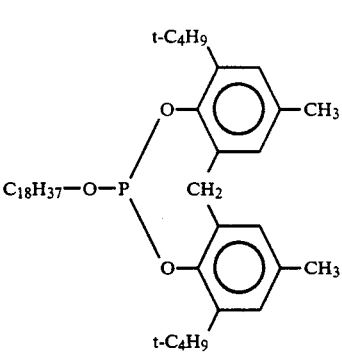 | 421 |

The superiority of the phosphites of the invention when combined with this phenol is apparent from comparison with the bisphosphites of the controls.

EXAMPLES 20 TO 25

Linear low density polyethylene compositions were prepared having the following formulation:

| Ingredient | Parts by Weight |
|---|---|
| Unstabilized linear low density | 100 |

-continued

| Ingredient | Parts by Weight |
|---|---|
| polyethylene | |
| Phenolic antioxidant | 0.02 |

-continued

| Ingredient | Parts by Weight |
|---|---|
| [1,3,5-tris(3,5-di-tert-butyl-4-hydroxybenzyl)isocyanurate structure] | |
| Phosphite as shown in Table IV | 0.02 |

The stabilizers were blended with the polymer in a Brabender Plastograph at 230° C. for 60 minutes, and a velocity of 80 rpm.

The yellowness index and carbonyl index of the compositions were noted, and the results are shown in Table IV.

TABLE IV

| | Phosphite | Yellowness Index | Carbonyl Index |
|---|---|---|---|
| Controls | | | |
| 1 | None | 49.8 | 2.03 |
| 2 | [tris(2,4-di-tert-butylphenyl) phosphite-like structure with methylene bridge] | 46.1 | 1.96 |
| 3 | [bis-phosphite structure with neopentyl bridge, t-C$_4$H$_9$ and CH$_3$ substituents, subscript 2] | 43.5 | 1.63 |
| Examples | | | |
| 20 | [CH$_3$—O—P cyclic phosphite structure with t-C$_4$H$_9$ substituents] | 35.8 | 1.30 |

TABLE IV-continued
| Phosphite | Yellowness Index | Carbonyl Index |
|---|---|---|
| 21 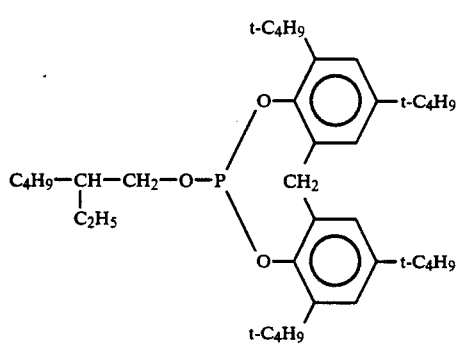 | 36.0 | 1.30 |
| 22 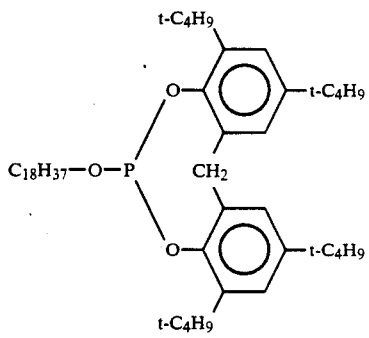 | 35.4 | 1.30 |
| 23 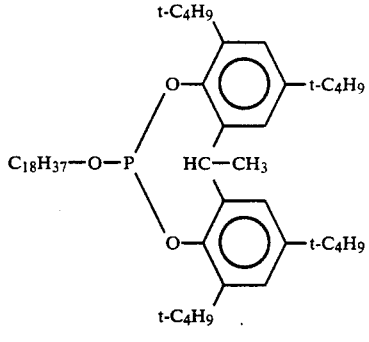 | 34.5 | 1.25 |
| 24 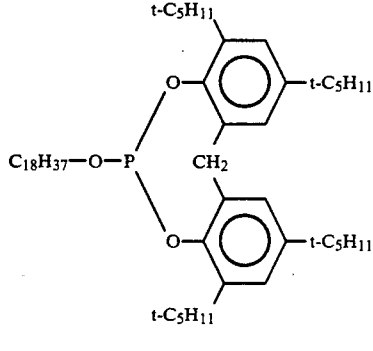 | 35.7 | 1.30 |

TABLE IV-continued

| Phosphite | | Yellowness Index | Carbonyl Index |
|---|---|---|---|
| 25 | 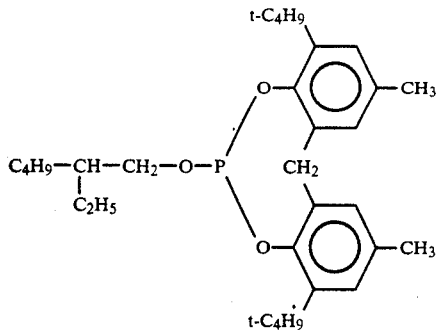 | 35.1 | 1.25 |

The superiority of the phosphites of the invention when combined with this phenol is apparent from comparison with the bisphosphites of the controls.

| Examples 26 to 35 | |
|---|---|
| Ingredient | Parts by Weight |
| Acrylonitrile-butadiene-styrene terpolymer | 100 |
| Calcium stearate | 0.5 |
| Phenolic antioxidant | 0.25 |

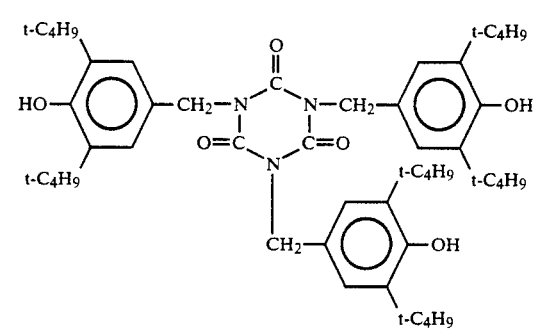

| Examples 26 to 35 | |
|---|---|
| Ingredient | Parts by Weight |
| Phosphite as shown in Table V | 0.25 |

The compositions were extruded at 240° C. to prepare pellets. Test pieces 1 mm thick were then molded by injection molding at 280° C.

The whiteness index of the pieces after heating at 180° C. in a Geer oven for 30 minutes and the Izod impact strength (kg.cm/cm) of the pieces after heating for two weeks at 120° C. in a Geer oven were noted.

The results are shown in Table V.

TABLE V

| | Phosphite | Whiteness Index | Izod impact strength |
|---|---|---|---|
| Controls | | | |
| 1 | None | 19.7 | 9.0 |
| 2 | 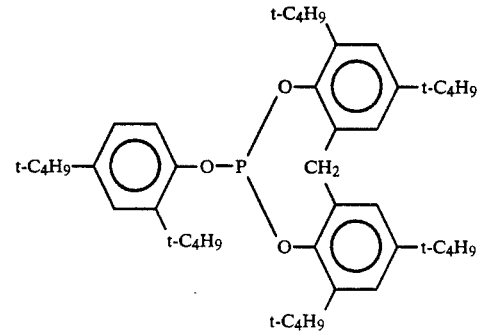 | 22.6 | 12.1 |

TABLE V-continued

| Phosphite | | Whiteness Index | Izod impact strength |
|---|---|---|---|
| 3 | [structure: (CH₃)₂C(CH₃)—CH₂—O—P with two (t-C₄H₉, CH₃-substituted phenoxy-CH₂-phenoxy) groups]₂ | 25.4 | 13.9 |

Examples

| 26 | CH₃—O—P with bis(2-t-C₄H₉, 4-t-C₄H₉-phenoxy) bridged by CH₂, additional t-C₄H₉ | 32.1 | 16.5 |
| 27 | C₂H₅—O—P with bis(2-t-C₄H₉, 4-t-C₄H₉-phenoxy) bridged by CH₂, additional t-C₄H₉ | 31.5 | 16.0 |
| 28 | C₄H₉—CH(C₂H₅)—CH₂—O—P with bis(2-t-C₄H₉, 4-t-C₄H₉-phenoxy) bridged by CH₂, additional t-C₄H₉ | 31.7 | 16.3 |

TABLE V-continued

| Phosphite | | Whiteness Index | Izod impact strength |
|---|---|---|---|
| 29 | [structure: C₁₂H₂₅—O—P with bis(2,4-di-t-butylphenoxy) bridged by CH₂] | 31.2 | 15.8 |
| 30 | [structure: C₁₈H₃₇—O—P with bis(2,4-di-t-butylphenoxy) bridged by CH₂] | 31.4 | 16.4 |
| 31 | [structure: C₁₈H₃₇—O—P with bis(2,4-di-t-butylphenoxy) bridged by HC—CH₃] | 32.2 | 16.5 |
| 32 | [structure: C₁₈H₃₇—O—P with bis(2,4-di-t-amylphenoxy) bridged by CH₂] | 31.8 | 16.3 |

TABLE V-continued

| Phosphite | | Whiteness Index | Izod impact strength |
|---|---|---|---|
| 33 | [structure: CH₃—O—P with two O-linked 2,4-di-t-butyl-... actually: methyl phosphite with bis(3-t-butyl-5-methylphenyl)methane bridge]  t-C₄H₉ / CH₃ / CH₂ bridge / CH₃ / t-C₄H₉ | 31.4 | 15.9 |
| 34 | [structure: 2-ethylhexyl phosphite with same bisphenol-methane bridge bearing t-C₄H₉ and CH₃ groups] C₄H₉—CH(C₂H₅)—CH₂—O—P | 31.9 | 16.3 |
| 35 | [structure: C₁₈H₃₇—O—P with same bisphenol-methane bridge bearing t-C₄H₉ and CH₃ groups] | 32.0 | 16.3 |

The superiority of the phosphites of the invention when combined with this phenol is apparent from comparison with the bisphosphites of the controls.

EXAMPLES 36 TO 41

Polycarbonate/heat resistant ABS resin compositions were prepared having the following formulation:

| Ingredient | Parts by Weight |
|---|---|
| Polycarbonate resin | 50 |
| Heat resistant ABS resin (containing 40 weight % of α-Methylstyrene) | 50 |
| Phenolic antioxidant | 0.25 |

| Ingredient | Parts by Weight |
|---|---|
| [structure: tris(3-t-butyl-4-hydroxy-5-methylbenzyl) isocyanurate] | |
| Phosphite as shown in Table VI | 0.3 |

The compositions were extruded at 280° C. to prepare pellets. Test pieces 12.7 mm thick were then molded by injection molding at 280° C. after holding for five minutes.

The whiteness index and the Izod impact strength (kg.cm/cm) of the pieces were measured, and the results are shown in Table VI.

TABLE VI

| | Phosphite | Whiteness Index | Izod impact strength |
|---|---|---|---|
| Controls | | | |
| 1 | None | 25.4 | 0.9 |
| 2 | (2,4-di-t-C$_4$H$_9$-phenyl) based phosphite with CH$_2$ bridge (structure shown) | 27.6 | 1.1 |
| 3 | Bis[neopentyl/methylated phenyl] phosphite (structure shown) | 29.3 | 1.4 |
| Examples | | | |
| 36 | Ethyl ester of cyclic phosphite with CH$_2$-bridged di-t-butylphenyl groups (structure shown) | 35.2 | 2.1 |
| 37 | 2-Ethylhexyl ester of cyclic phosphite with CH$_2$-bridged di-t-butylphenyl groups (structure shown) | 35.1 | 2.0 |

TABLE VI-continued

| Phosphite | | Whiteness Index | Izod impact strength |
|---|---|---|---|
| 38 | $C_{18}H_{37}$—O—P with bis(3-t-C$_4$H$_9$-5-t-C$_4$H$_9$-phenyl)methylene bridge (t-C$_4$H$_9$ substituents) | 35.1 | 2.1 |
| 39 | $C_{18}H_{37}$—O—P with bis(3-t-C$_4$H$_9$-5-t-C$_4$H$_9$-phenyl)ethylidene (HC—CH$_3$) bridge | 35.2 | 2.1 |
| 40 | $CH_3$—O—P with bis(3-t-C$_4$H$_9$-5-CH$_3$-phenyl)methylene bridge | 34.8 | 1.9 |
| 41 | $C_{18}H_{37}$—O—P with bis(3-t-C$_4$H$_9$-5-CH$_3$-phenyl)methylene bridge | 34.9 | 2.0 |

The superiority of the phosphites of the invention when combined with this phenol is apparent from comparison with the bisphosphites of the controls.

EXAMPLES 42 TO 48

Polyphenylene oxide resin compositions were prepared having the following formulation:

| Ingredient | Parts by Weight |
|---|---|
| Poly(2,6-dimethyl-1,4-phenyleneoxide) | 45 |
| High impact polystyrene | 55 |
| Phenolic antioxidant | 0.25 |

| Ingredient | Parts by Weight |
|---|---|
| -continued 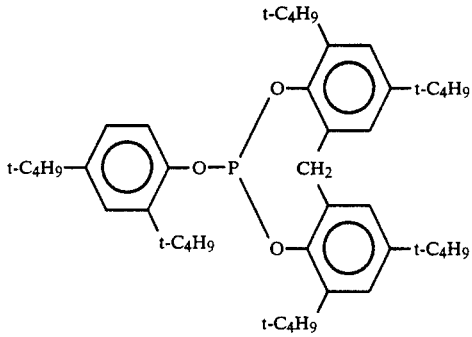 | |
| Phosphite as shown in Table VII | 0.45 |

The compositions were extruded at 280° C. to prepare pellets, and then test pieces were molded by injection molding at 280° C.

The pieces were heated at 120° C. in a Geer oven for two weeks, and Izod impact strength before and after heating was measured.

The results are shown in Table VII.

TABLE VII

| Phosphite | | Izod Impact Strength | |
|---|---|---|---|
| | | Before heating | After heating |
| Controls | | | |
| 1 | 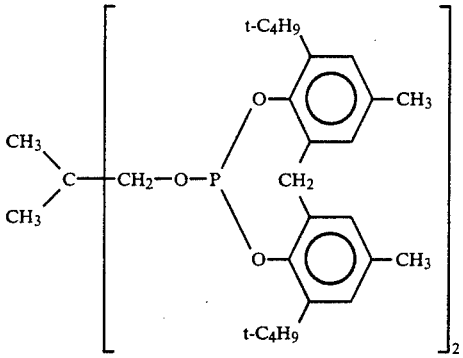 | 11.0 | 6.7 |
| 2 | (structure) | 11.3 | 7.7 |
| Examples | | | |
| 42 | 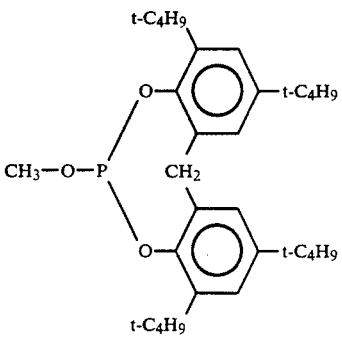 | 12.8 | 11.0 |

TABLE VII-continued
| | Phosphite | Izod Impact Strength | |
|---|---|---|---|
| | | Before heating | After heating |
| 43 | 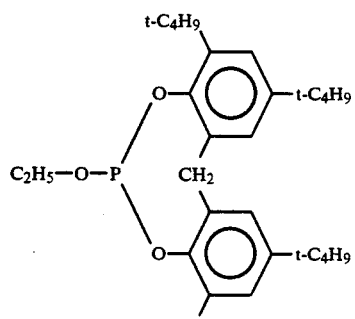 | 12.5 | 10.6 |
| 44 | 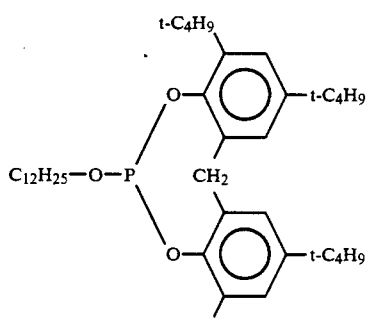 | 12.8 | 11.1 |
| 45 | 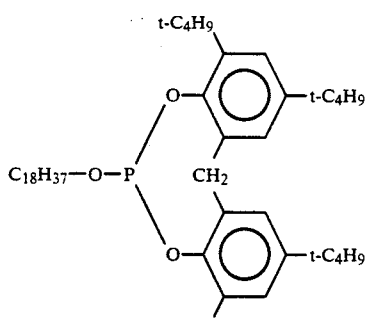 | 12.7 | 10.9 |
| 46 | 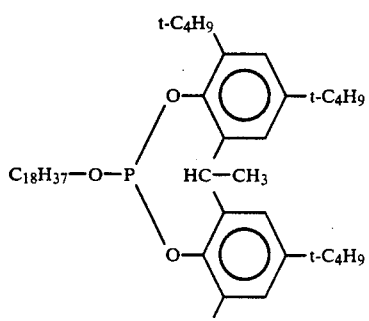 | 12.9 | 10.7 |

TABLE VII-continued

| Phosphite | Izod Impact Strength | |
|---|---|---|
| | Before heating | After heating |
| 47 | 12.7 | 10.8 |
| 48 | 12.8 | 11.0 |

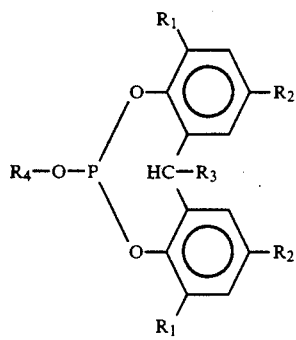

The superiority of the phosphites of the invention when combined with this phenol is apparent from comparison with the bisphosphites of the controls.

Having regard to the foregoing disclosure, the following is claimed as the inventive and patentable embodiments thereof:

1. A stabilizer composition for enhancing the resistance of synthetic resins to deterioration when exposed to elevated temperatures and/or ultraviolet light, comprising a bisphenol phosphite having the formula

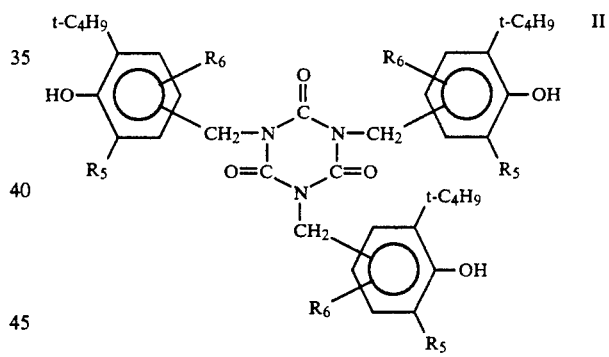

wherein $R_1$ is tertiary-butyl or tertiary-amyl, $R_2$ is alkyl having from one to about nine carbon atoms, $R_3$ is hydrogen or alkyl having from one to about four carbon atoms, and $R_4$ is alkyl having from one to about thirty carbon atoms; and a phenol having the formula wherein $R_5$ is alkyl having from one to about four carbon atoms; and $R_6$ is hydrogen or alkyl having from one to about four carbon atoms.

2. A stabilizer composition according to claim 1 in which $R_1$ and $R_2$ are each tertiary butyl.

3. A stabilizer composition according to claim 1 in which $R_1$ and $R_2$ are each tertiary amyl.

4. A stabilizer composition according to claim 1 in which $R_1$ is tertiary butyl and $R_2$ is methyl.

5. A stabilizer composition according to claim 1 in which $R_3$ is hydrogen or methyl.

6. A stabilizer composition according to claim 1 in which $R_1$ is tertiary amyl.

7. A stabilizer composition according to claim 1 in which $R_1$ is tertiary butyl.

8. A stabilizer composition according to claim 1 in which $R_4$ is methyl, ethyl, isodecyl, dodecyl or octadecyl.

9. A stabilizer composition according to claim 1 in which $R_5$ is tertiary butyl.

10. A stabilizer composition according to claim 1 in which $R_5$ is methyl.

11. A stabilizer composition according to claim 1 in which the phosphite is

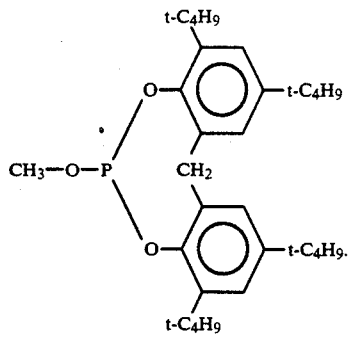

12. A stabilizer composition according to claim 1 in which the phosphite is

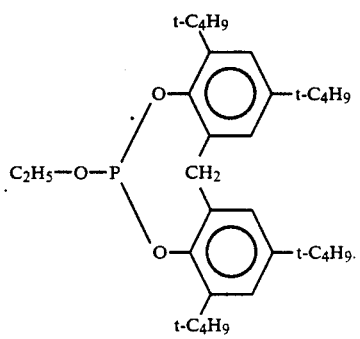

13. A stabilizer composition according to claim 1 in which the phosphite is

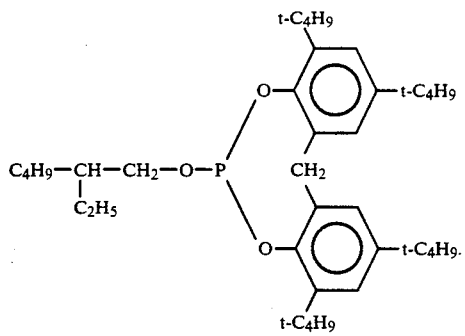

14. A stabilizer composition according to claim 1 in which the phosphite is

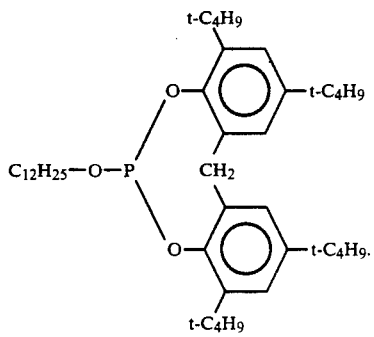

15. A stabilizer composition according to claim 1 in which the phosphite is

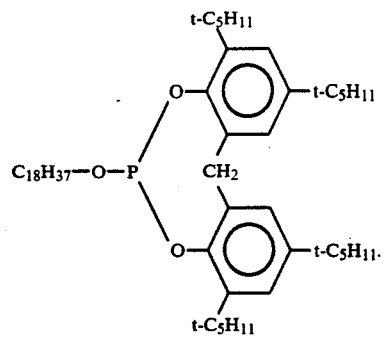

16. A stabilizer composition according to claim 1 in which the phosphite is

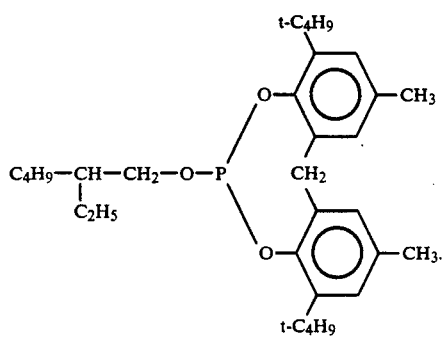

17. A stabilizer composition according to claim 1 in which the phosphite is

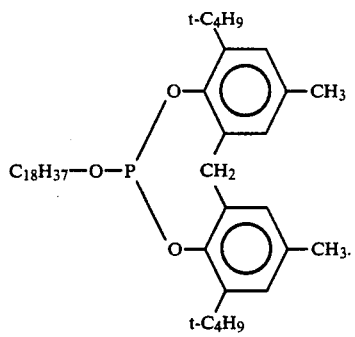

18. A stabilizer composition according to claim 1 in which the phosphite is

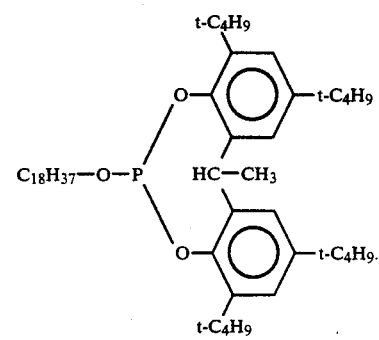

19. A stabilizer composition according to claim 1 in which the phenol is

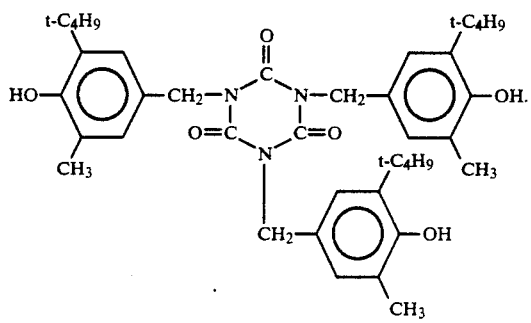

20. A stabilizer composition according to claim 1 in which the phenol is

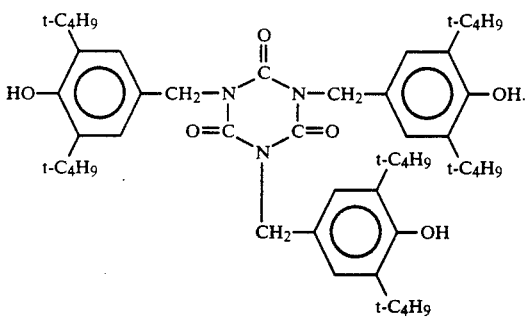

21. A stabilizer composition according to claim 1 in which the phenol is

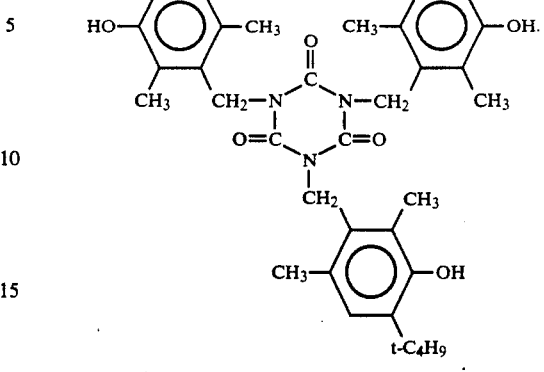

22. A stabilizer composition according to claim 1 in which the phenol is

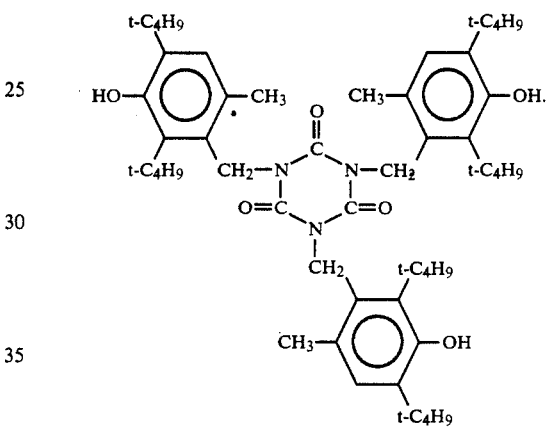

23. An olefin polymer composition having improved resistance to deterioration comprising a polymer of an alpha-olefin having from two to six carbon atoms and a stabilizer composition in accordance with claim 1.

24. An olefin polymer composition in accordance with claim 23 wherein the polyolefin is polypropylene.

25. An olefin polymer composition in accordance with claim 23 wherein the polyolefin is polyethylene.

26. An acrylonitrile-butadiene-styrene terpolymer having improved resistance to deterioration comprising acrylonitrile-butadiene-styrene terpolymer and a stabilizer composition in accordance with claim 1.

27. A mixed polycarbonate acrylonitrile butadiene styrene terpolymer composition having improved resistance to deterioration comprising a polycarbonate, an acrylonitrile butadiene styrene terpolymer, and a stabilizer composition in accordance with claim 1.

28. A mixed polyphenylene-oxide-polystyrene polymer composition having improved resistance to deterioration comprising polyphenylene oxide, polystyrene, and a stabilizer composition in accordance with claim 1.

* * * * *